US012791822B2

(12) United States Patent
Komiyama

(10) Patent No.: US 12,791,822 B2
(45) Date of Patent: Nov. 10, 2026

(54) CEMENTED LENS, IMAGING LENS, AND IMAGING DEVICE

(71) Applicant: NIDEC INSTRUMENTS CORPORATION, Nagano (JP)

(72) Inventor: Tadashi Komiyama, Nagano (JP)

(73) Assignee: NIDEC INSTRUMENTS CORPORATION, Nagano (JP)

( * ) Notice: Subject to any disclaimer, the term of this patent is extended or adjusted under 35 U.S.C. 154(b) by 234 days.

(21) Appl. No.: 18/675,102

(22) Filed: May 27, 2024

(65) Prior Publication Data

US 2024/0402470 A1 Dec. 5, 2024

(30) Foreign Application Priority Data

May 31, 2023 (JP) ................................ 2023-089830

(51) Int. Cl.
*G02B 7/02* (2021.01)
*G02B 3/00* (2006.01)
*G02B 13/00* (2006.01)

(52) U.S. Cl.
CPC ............... *G02B 7/025* (2013.01); *G02B 3/00* (2013.01); *G02B 7/026* (2013.01); *G02B 13/006* (2013.01)

(58) Field of Classification Search
None
See application file for complete search history.

(56) References Cited

U.S. PATENT DOCUMENTS

| | | | | |
|---|---|---|---|---|
| 4,662,717 | A * | 5/1987 | Yamada | G02B 7/022 359/811 |
| 9,042,040 | B2 * | 5/2015 | Kim | G02B 13/002 359/741 |
| 11,402,599 | B2 | 8/2022 | Komiyama | |
| 2019/0310438 | A1 | 10/2019 | Komiyama | |
| 2020/0073077 | A1 * | 3/2020 | Kanzaki | G02B 3/04 |
| 2022/0146777 | A1 * | 5/2022 | Inaba | G02B 7/021 |
| 2024/0012182 | A1 * | 1/2024 | Moon | G02B 3/04 |

FOREIGN PATENT DOCUMENTS

| | | |
|---|---|---|
| JP | 2018097019 | 6/2018 |

* cited by examiner

*Primary Examiner* — Darryl J Collins
(74) *Attorney, Agent, or Firm* — JCIPRNET

(57) ABSTRACT

In a cemented lens, an object-side lens includes a concave first lens surface, a first flange surface, and a first boundary portion between the first lens surface and the first flange surface. An image-side lens includes a convex second lens surface, a second flange surface, and a second boundary portion between the second lens surface and the second flange surface. A cross section including an optical axis of the first boundary portion includes a plurality of circular arc shapes. If the cross section has a circular arc shape with a single radius and a position of an apex of the circular arc shape is a virtual position, a distance between an actual apex position of the cross section and the first flange surface in a direction of the optical axis is shorter than that between the virtual position and the first flange surface in the direction of the optical axis.

18 Claims, 23 Drawing Sheets

CEMENTED LENS, IMAGING LENS, AND IMAGING DEVICE

CROSS REFERENCE TO RELATED APPLICATION

This application claims the priority benefits of Japanese Application No. 2023-089830 filed May 31, 2023. The entirety of the above-mentioned patent application is hereby incorporated by reference herein and made a part of this specification.

BACKGROUND

Field of the Invention

The technique of the present disclosure relates to a cemented lens, an imaging lens, and an imaging device.

Description of the Related Documents

An imaging element used in combination with an imaging lens has a large size due to an increase in the number of pixels. Even when the imaging element is increased in size in this way, the imaging lens is required to suppress an increase in size while ensuring favorable optical performance. As an imaging lens intended for miniaturization, for example, an imaging lens described in the following Japanese Unexamined Patent Publication No. 2018-97019 is known. The cemented lens included in the imaging lens described in Japanese Unexamined Patent Publication No. 2018-97019 includes a protrusion or a recess in a boundary portion between a cemented lens surface and a flange surface. This is to suppress occurrence of a ghost due to reflection of light between the surface of the boundary portion and the cover disposed on the object side of the imaging element. Specifically, the cross section of the protrusion along the optical axis is formed in a circular arc shape having one radius, and the light reflected by the cover of the imaging element and directed to the boundary portion is reflected so as not to go toward the imaging element and travel to a region other than the imaging element.

The protrusion amount of the protrusion in the boundary portion is determined by the length of one radius that determines the circular arc shape of the cross section of protrusion.

The technique of the present disclosure was made in view of the above circumstances and is to provide a cemented lens, an imaging lens, and an imaging device capable of reducing a protrusion amount of a protrusion or a recess amount of a recess in a boundary portion between a lens surface and a flange surface of the cemented lens.

SUMMARY

In order to achieve the above object, a first aspect of the technique of the present disclosure is a cemented lens in which an object-side lens and an image-side lens are cemented together with an adhesive layer. The object-side lens includes, on a side to be cemented to the image-side lens, a first lens surface that is either convex or concave, a first flange surface provided at an outer peripheral edge of the first lens surface, and a first boundary portion between the first lens surface and the first flange surface. The image-side lens includes, on a side to be cemented to the object-side lens, a second lens surface that is either convex or concave, a second flange surface provided at an outer peripheral edge of the second lens surface, and a second boundary portion between the second lens surface and the second flange surface. A cross section including an optical axis of the first boundary portion includes a plurality of circular arc shapes. In a case where the cross section including the optical axis of the first boundary portion has a circular arc shape with a single radius and a position of an apex of the circular arc shape is a virtual position, in the plurality of circular arc shapes, a distance between an actual apex position of the cross section and the first flange surface in a direction of the optical axis is shorter than a distance between the virtual position and the first flange surface in the direction of the optical axis.

An imaging lens according to a second aspect of the technique of the present disclosure includes the cemented lens according to the first aspect.

An imaging device according to a third aspect of the technique of the present disclosure includes the imaging lens according to the second aspect.

The technique of the present disclosure can reduce the protrusion amount of the protrusion or the recess amount of the recess in the boundary portion between the cemented lens surface and the flange surface of the cemented lens.

BRIEF DESCRIPTION OF THE DRAWINGS

Embodiments will now be described, by way of example only, with reference to the accompanying drawings which are meant to be exemplary, not limiting, and wherein like elements are numbered alike in several figures, in which.

DETAILED DESCRIPTION

Hereinafter, an embodiment of a lens unit of the technique of the present disclosure will be described with reference to the drawings.

(Optical System)

Figure 1:
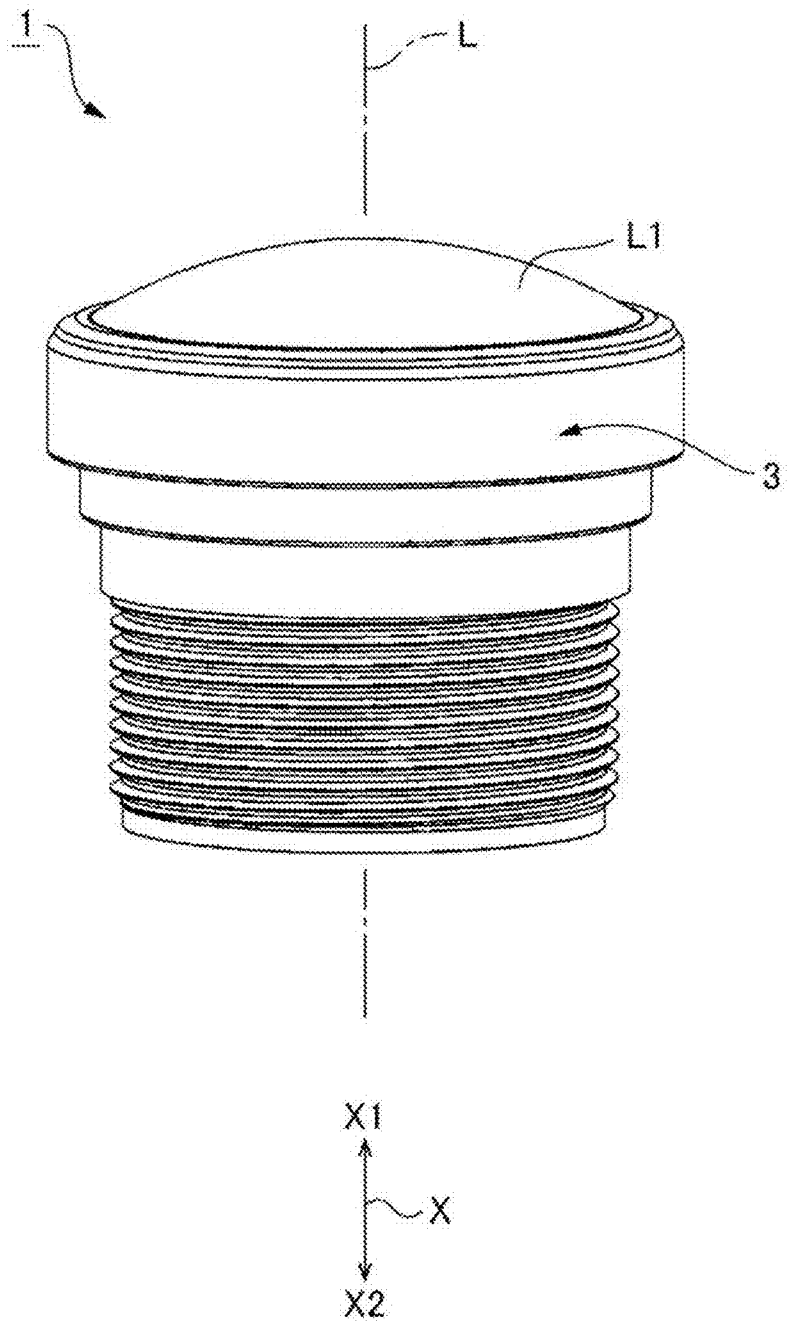
FIG. 1 is an external perspective view of a lens unit according to a first embodiment.
Figure 2:
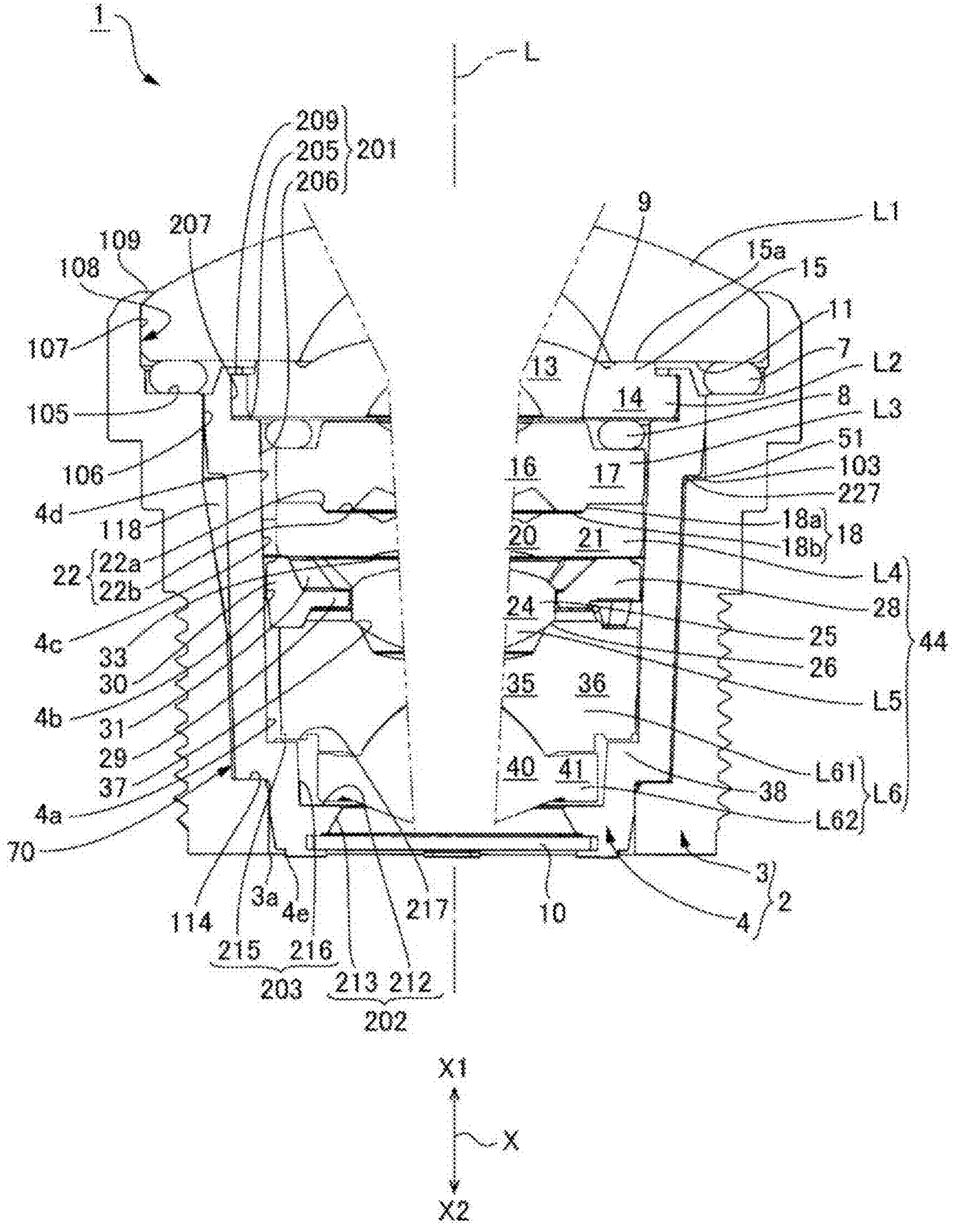
FIG. 2 is a cross-sectional view of the lens unit.
Figure 3:
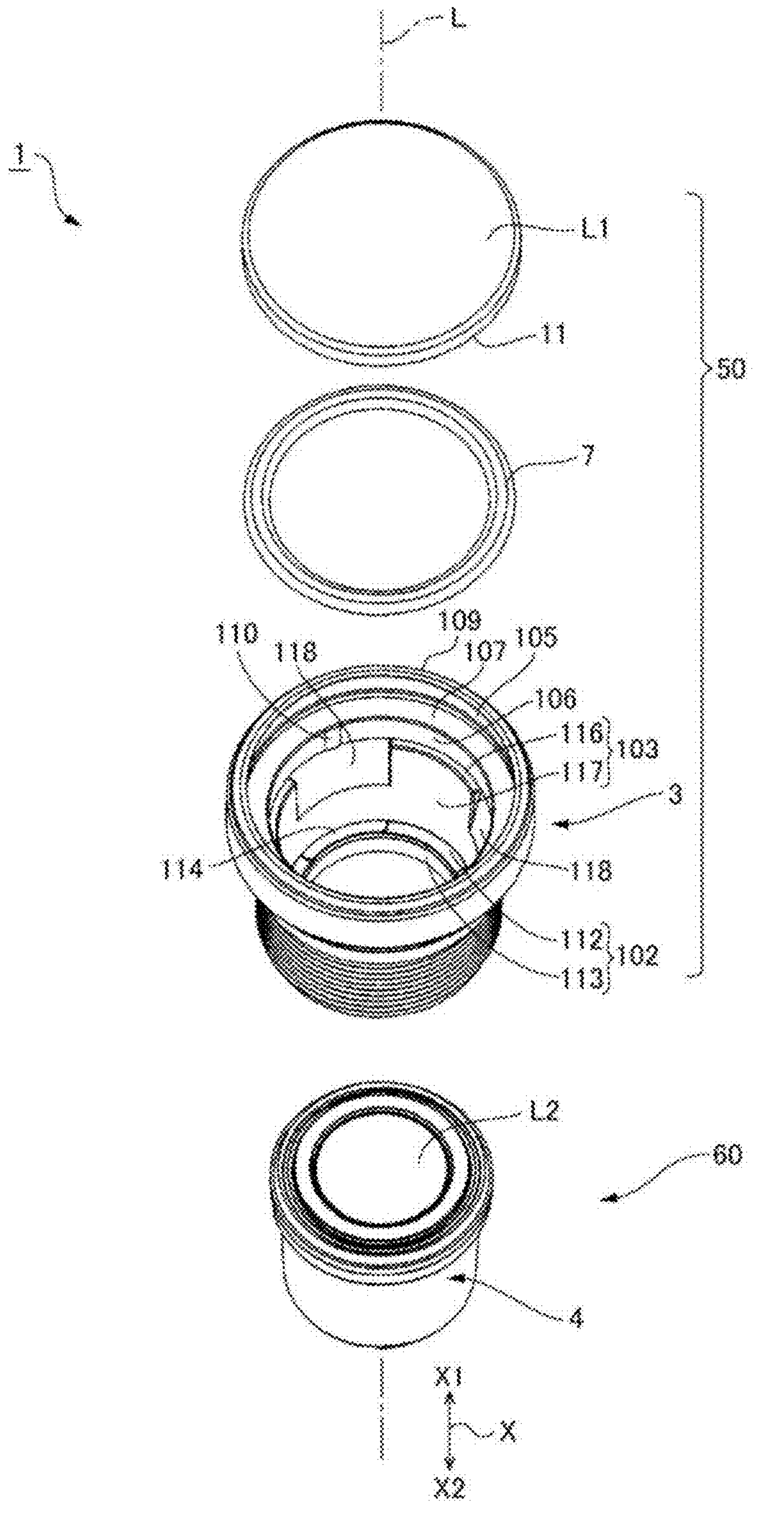
FIG. 3 is an exploded perspective view of the lens unit.
Figure 4:
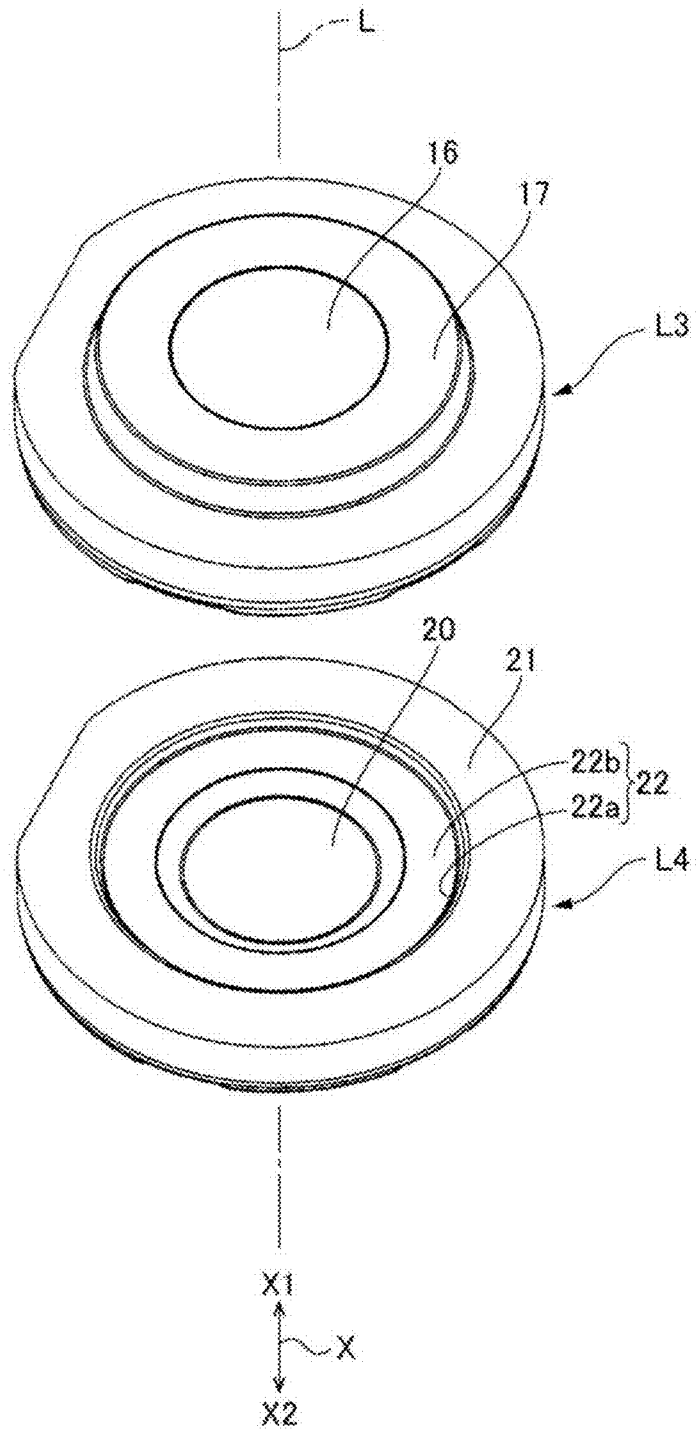
FIG. 4 is an exploded perspective view of a lens L3 and a lens L4 when viewed from an object side.
Figure 5:
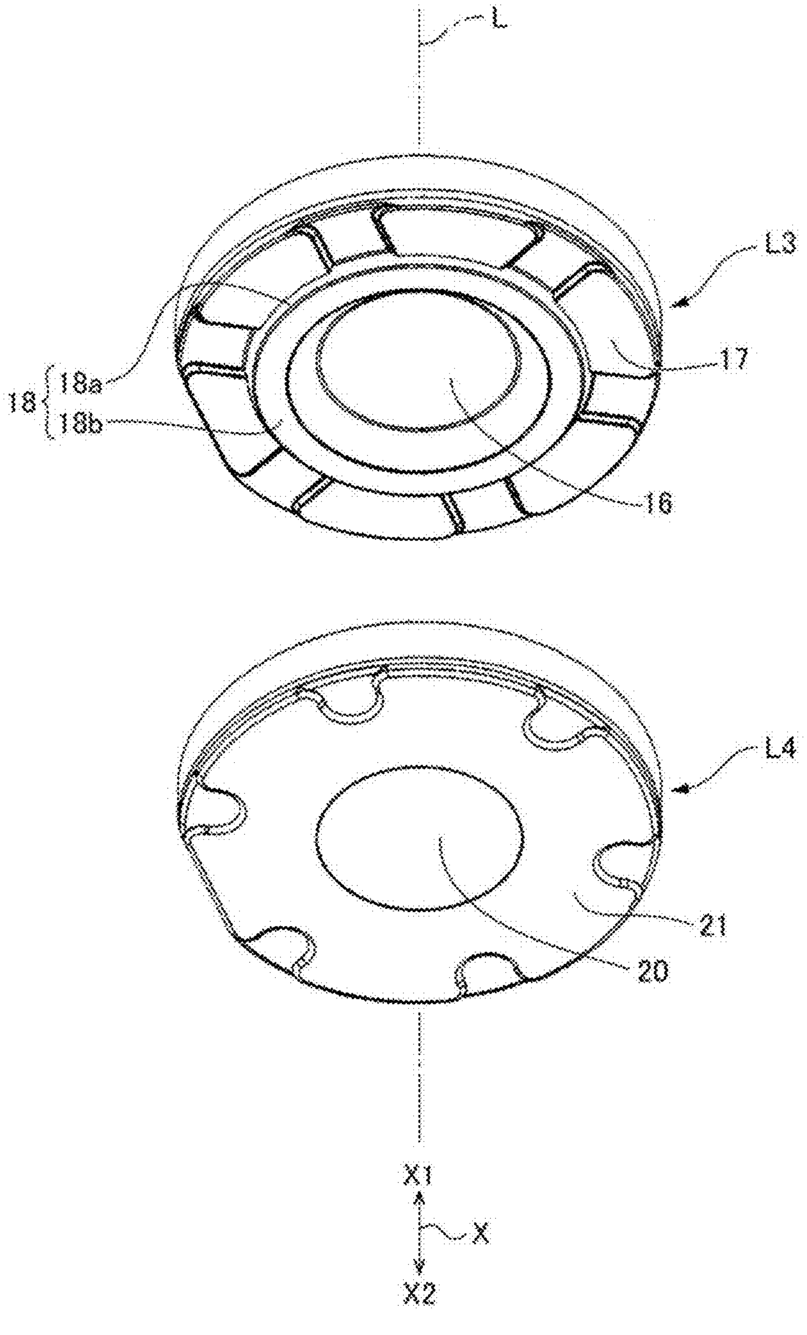
FIG. 5 is an exploded perspective view of the lens L3 and the lens L4 when viewed from an image side.
Figure 6:
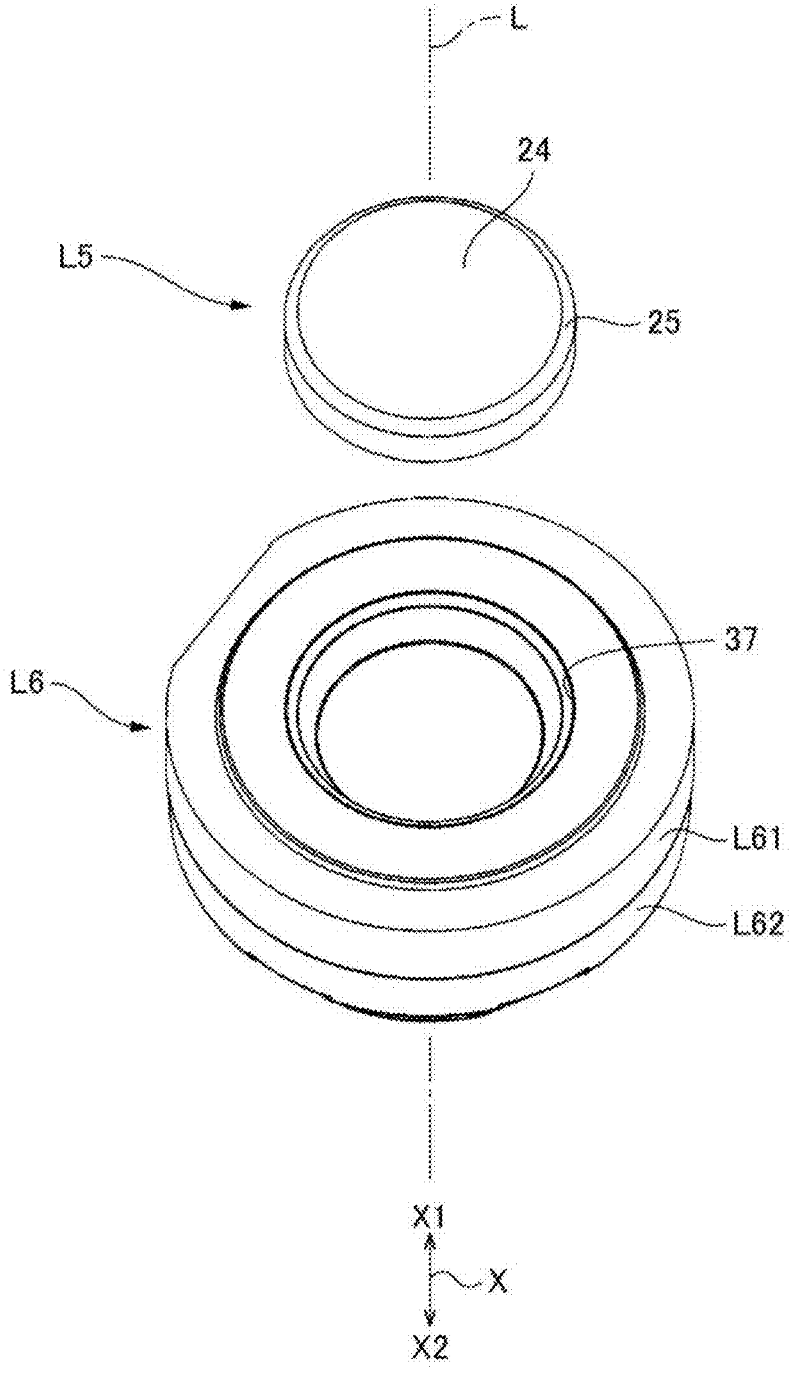
FIG. 6 is an exploded perspective view of a lens L5 and a lens L6 when viewed from the object side.
Figure 7:
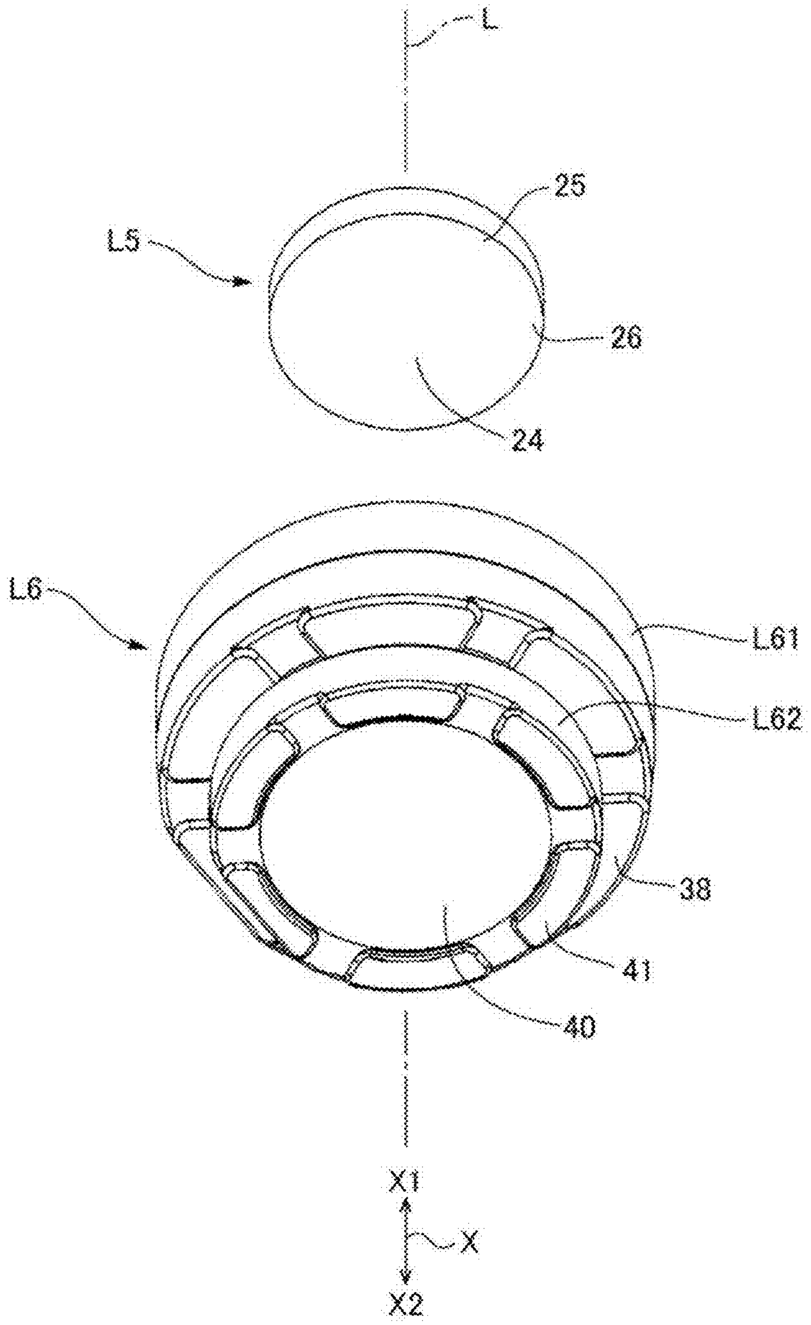
FIG. 7 is an exploded perspective view of the lens L5 and the lens L6 when viewed from the image side.
Figure 8:
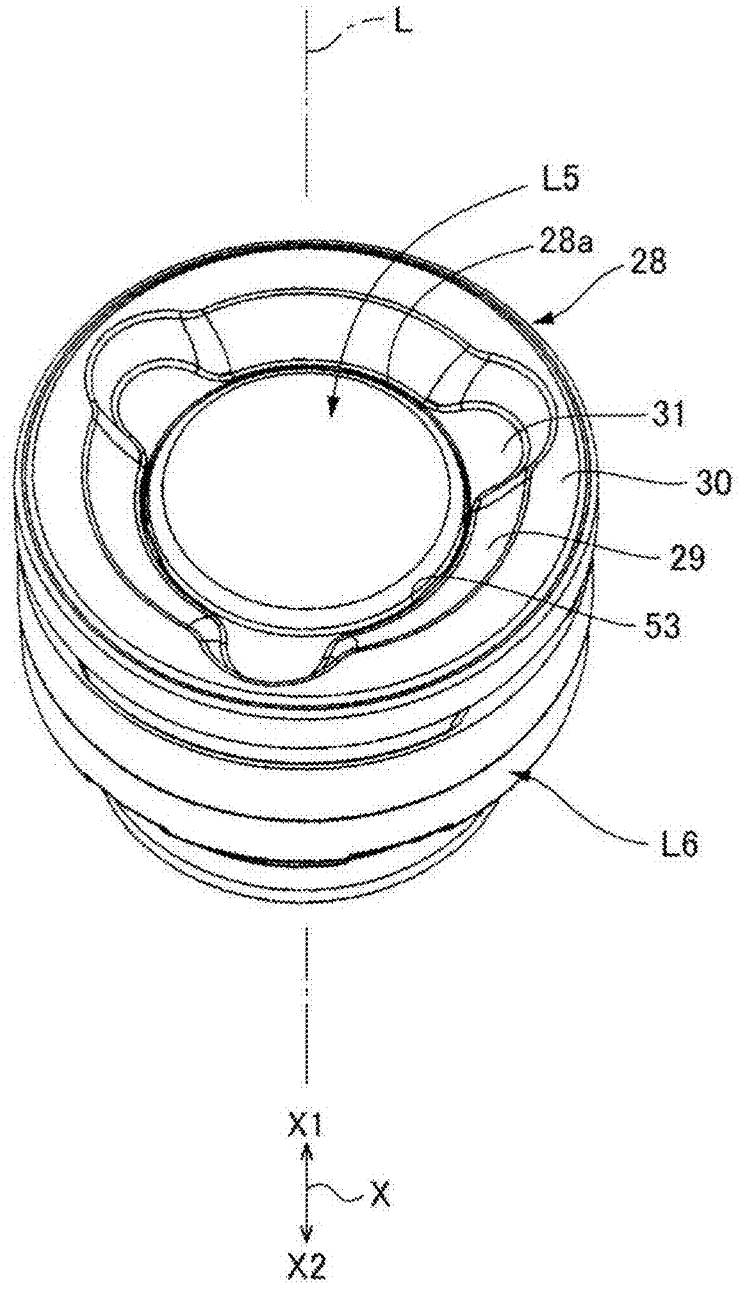
FIG. 8 is a perspective view of a holder, the lens L5, and the lens L6.

FIG. 1 is an external perspective view of a lens unit to which at least an embodiment of the present invention is applied. FIG. 2 is a cross-sectional view of the lens unit. FIG. 3 is an exploded perspective view of the lens unit. FIG. 4 is an exploded perspective view of a lens L3 and a lens L4 when viewed from an object side. FIG. 5 is an exploded perspective view of the lens L3 and the lens L4 when viewed from an image side. FIG. 6 is an exploded perspective view of a lens L5 and a lens L6 when viewed from the object side. FIG. 7 is an exploded perspective view of the lens L5 and the lens L6 when viewed from the image side. FIG. 8 is a perspective view of a holder, the lens L5, and the lens L6. In FIG. 2, the shape of each lens in a region (around the optical axis) between two dot chain lines is omitted.

A lens unit 1 according to this example illustrated in FIG. 1 is used in an imaging device mounted on an automobile or a surveillance camera. As illustrated in FIG. 2, the lens unit 1 includes a lens L1, a lens L2, the lens L3, the lens L4, the lens L5, and the lens L6 in this order from the object side to the image side. The lens L6 is a cemented lens and includes an object-side lens L61 and an image-side lens L62 in this order from the object side to the image side. Further, the lens unit 1 includes, as a lens barrel 2, a first lens barrel 3 and a second lens barrel 4 held on the inner peripheral side of the first lens barrel 3. The lens L1 is housed in the first lens barrel 3. The lenses L2 to L6 are housed in the second lens barrel 4. The second lens barrel 4 is held on the inner peripheral side of the first lens barrel 3.

As illustrated in FIG. 3, the lens L1 and the first lens barrel 3 constitute a first unit 50. The lenses L2 to L6 and the second lens barrel 4 constitute a second unit 60. Hereinafter, a direction along an optical axis L of the lens L1 is referred to as an optical axis direction X. The optical axis L of the lens L1 is the optical axis L of the lens unit 1. An object side X1 in the optical axis direction X is the side where the lens L1 is located, and an image side X2 is the side where the lens L6 is located.

As illustrated in FIG. 2, the lens L1 has a larger outer diameter than the lenses L2 to L6. In this example, the lens L1 is made of glass. The lens L1 is a meniscus lens having a convex shape on the object side X1. The lens L1 includes an annular end surface 11 spreading in a direction orthogonal to the optical axis L on the outer peripheral side of the lens surface on the image side X2. On the image side X2 of the end surface 11 of the lens L1, a first O-ring 7 is disposed.

The lens L2 is made of resin. The lens L2 includes a lens body portion 13 including a lens surface and a flange portion 14 surrounding the lens body portion 13. The lens L2 is a meniscus lens having a convex shape on the object side X1. An annular protruding portion 15 protruding to the object side X1 is provided at an end surface of the flange portion 14 on the object side X1. The top of the annular protruding portion 15 is an annular contacting portion 15*a* in surface contact with the end surface of the lens L1.

As illustrated in FIGS. 2, 4, and 5, the lens L3 is made of resin. The lens L3 includes a lens body portion 16 including a lens surface and a flange portion 17 surrounding the lens body portion 16. The lens L3 is a meniscus lens having a convex shape on the image side X2. As illustrated in FIG. 5, an annular fitting portion 18 protruding to the image side X2 is provided on the end surface of the flange portion 17 on the image side X2. The fitting portion 18 includes a fitting portion tapered surface 18*a*, which surrounds the optical axis L and is inclined to the inner peripheral side toward the image side X2, and a fitting portion end surface 18*b*, which extends perpendicular to the optical axis L toward the inner peripheral side from an end of the fitting portion tapered surface 18*a* on the image side X2.

Here, as illustrated in FIG. 2, an elastic member is provided between the lens L2 and the lens L3 in the optical axis direction X. The elastic member is a second O-ring 8. The second O-ring 8 is compressed in the optical axis direction X between the flange portion 14 of the lens L2 and the flange portion 17 of the lens L3. In this example, a resin-made light shielding sheet 9 is disposed between the lens L1 and the lens L2 in the optical axis direction X. The light shielding sheet 9 is annular. The second O-ring 8 is located between the light shielding sheet 9 and the lens L3.

The lens L4 is made of resin. As illustrated in FIGS. 2, 4, and 5, the lens L4 includes a lens body portion 20 including a lens surface and a flange portion 21 surrounding the lens body portion 20. The lens surface of the lens body portion 20 of the lens L4 on the object side X1 is a curved surface protruding to the object side X1. The lens surface of the lens body portion 20 on the image side X2 includes, at the center, a curved surface portion protruding to the image side X2.

As illustrated in FIG. 4, a fitted portion 22 into which the fitting portion 18 of the lens L3 is fitted is provided on the end surface of the flange portion 21 on the object side X1. The fitted portion 22 includes a fitted portion tapered surface 22*a*, which surrounds the optical axis L and is inclined to the inner peripheral side toward the image side X2, and a fitted portion end surface 22*b*, which extends perpendicular to the optical axis L toward the inner peripheral side from an end of the fitted portion tapered surface 22*a* on the image side X2. As illustrated in FIG. 2, the fitting portion tapered surface 18*a* of the lens L3 and the fitted portion tapered surface 22*a* of the lens L4 are in surface contact with each other. The fitting portion end surface 18*b* of the lens L3 and the fitted portion end surface 22*b* of the lens L4 are separated from each other in the optical axis direction X. In this example, the end surface on the image side X2 of the outer peripheral side portion of the fitting portion 18 in the flange portion 17 of the lens L3 and the end surface on the object side X1 of the outer peripheral side portion of the fitted portion 22 in the flange portion 21 of the lens L4 are in contact with each other in the optical axis direction X. Thus, the lens L3 is placed on the lens L4, and the lens L3 is positioned in the optical axis direction X.

The lens L5 is made of glass. As illustrated in FIG. 2, the lens L5 has a smaller outer diameter than the lens L2, the lens L3, the lens L4, and the lens L6. The lens L5 includes a lens body portion 24 including a lens surface and a flange portion 25 surrounding the lens body portion 24. The lens L5 is a biconvex lens. As illustrated in FIGS. 2 and 7, the image side X2 of the flange portion 25 is a contacting portion 26 in contact with the lens L6 from the object side X1. A cross section of the contacting portion 26 cut along the optical axis Lis a circular arc that is curved to the object side X1 toward the outer peripheral side. As illustrated in FIG. 7, the surface of the contacting portion 26 on the image side X2 is continuous with the outer peripheral end of a lens surface 24*a* of the lens body portion 24 on the image side X2 without a step.

As illustrated in FIG. 2, a holder 28 made of resin is disposed radially outside the lens L5. As illustrated in FIG. 8, the holder 28 is annular. The holder 28 includes a central portion 29 adjacent to the lens L5 with a clearance 28*a* in the radial direction and an outer peripheral portion 30 that is thicker in the optical axis direction X than the central portion 29 on the outer peripheral side of the central portion 29. The surface of the central portion 29 on the object side X1 is inclined to the image side X2 from the outer peripheral portion 30 toward the inner peripheral side. At three positions in the circumferential direction of the central portion 29 and the outer peripheral portion 30, a cutout portion 31, which is cut out from the object side X1 and the inner peripheral side, is provided. A bottom surface (a surface facing the object side X1) of the cutout portion 31 is continuous with an end edge on the inner peripheral side of the central portion 29.

Here, a diaphragm 33 is disposed between the lens L4 and the lens L5. The diaphragm 33 is an annular sheet that is sandwiched between the lens L4 and the holder 28 and is supported at a predetermined position in the optical axis direction X.

The lens L6 is made of resin. That is, both the object-side lens L61 and the image-side lens L62 are made of resins. As illustrated in FIG. 2, the object-side lens L61 includes a lens body portion 35 including a lens surface and a flange portion 36 surrounding the lens body portion 35. A lens surface of the object-side lens L61 on the object side X1 is a curved surface that is curved to the image side X2, and a lens surface on the image side X2 is a curved surface that is recessed to the object side X1.

As illustrated in FIG. 6, the flange portion 36 of the object-side lens L61 includes, on the object side X1, a contacted portion 37 in contact with the contacting portion 26 of the lens L5. The contacted portion 37 is a tapered surface extending to the object side X1 toward the outer peripheral side. The contacting portion 26 and the contacted portion 37 are in line contact with each other. A contact line M along which the contacting portion 26 and the contacted portion 37 are in contact with each other has an annular shape coaxial with the optical axis L and is located on a virtual perpendicular plane S that is perpendicular to the optical axis L (see FIG. 12 described below). Further, the flange portion 36 of the object-side lens L61 includes an annular end surface 38 perpendicular to the optical axis L on the image side X2.

The image-side lens L62 includes a lens body portion 40 including a lens surface and a flange portion 41 surrounding the lens body portion 40. A lens surface of the image-side lens L62 on the object side X1 is a curved surface protruding to the object side X1, and a lens surface on the image side X2 is a curved surface protruding to the image side X2. The image-side lens L62 is fixed to the object-side lens L61. The outer diameter of the image-side lens L62 is smaller than the outer diameter of the object-side lens L61. Therefore, as illustrated in FIG. 7, when viewed from the image side X2, the flange portion 36 of the object-side lens L61 has a portion projecting from the image-side lens L62 to the outer peripheral side.

Here, as illustrated in FIG. 2, the lens L5 is stacked on the lens L6. Further, the lens L4 is stacked on the lens L6 via the holder 28. The lens L4, the holder 28, the lens L5, and the lens L6 constitute a stacked body 44. The lens L3 is stacked on the lens L4. That is, the lens L3 is stacked on the stacked body 44. Further, a plate-shaped cover 10 is provided on the image side X2 of the lens L6.

(Lens Barrel)

As illustrated in FIGS. 2 and 3, the lens unit 1 includes, as the lens barrel 2, the first lens barrel 3 and the second lens barrel 4 held on the inner peripheral side of the first lens barrel 3. Both the first lens barrel 3 and the second lens barrel 4 are made of resin. Further, the first lens barrel 3 and the second lens barrel 4 are resin injection molded products molded by injecting resin into a mold. The lens L1 is housed in the first lens barrel 3. The lenses L2 to L6 and the holder 28 are housed in the second lens barrel 4. The second lens barrel 4 is held on the inner peripheral side of the first lens barrel 3.

(First Lens Barrel and Lens L1)

Figure 9:
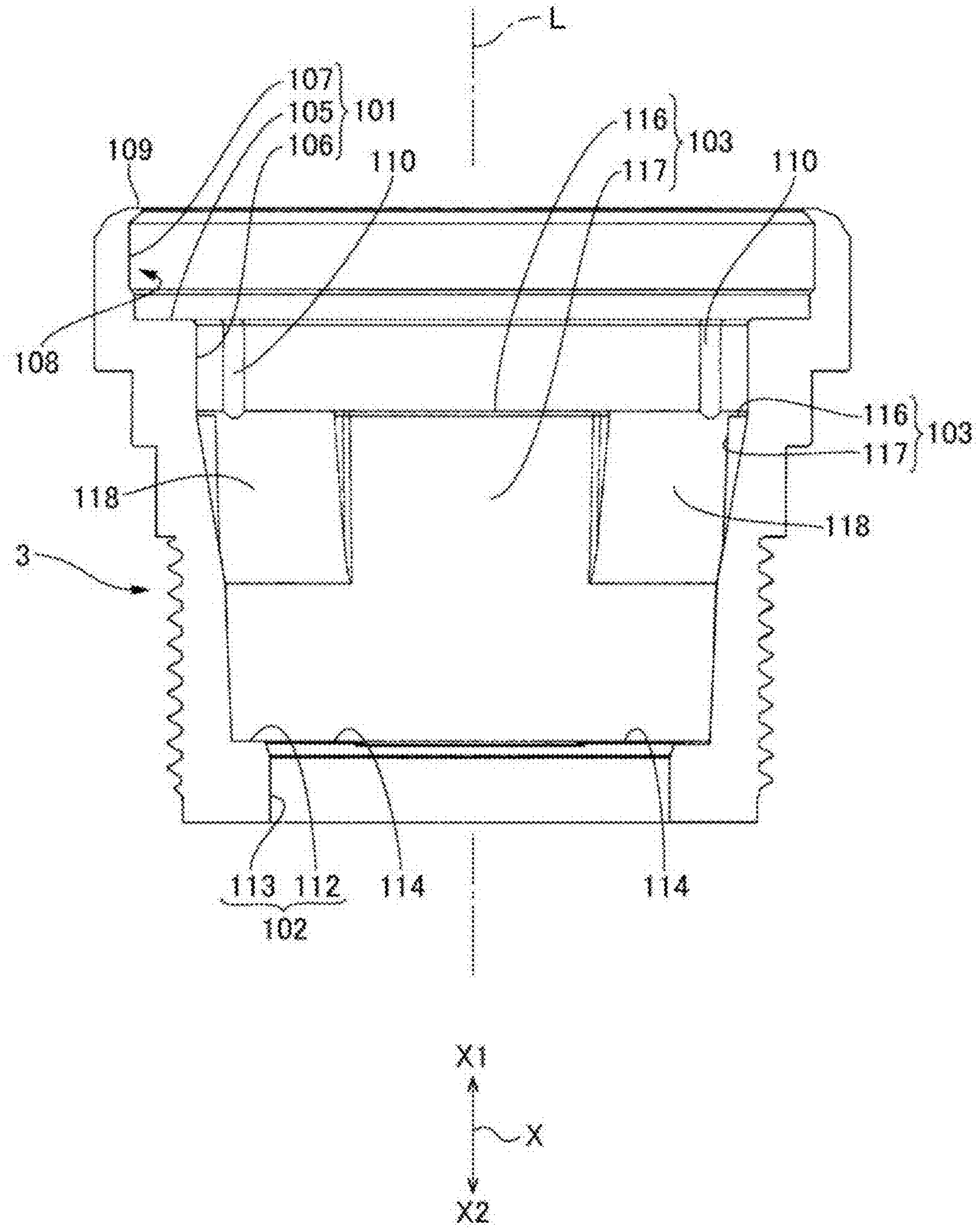
FIG. 9 is a cross-sectional view of a first lens barrel.

FIG. 9 is a cross-sectional view of the first lens barrel 3. The first lens barrel 3 has a cylindrical shape and is located on the outer peripheral side of the lens L2, the lens L3, the lens L4, the holder 28, the lens L5, the lens L6, and the second lens barrel 4. As illustrated in FIGS. 3 and 9, the first lens barrel 3 includes an object-side step portion 101 at an end portion of the inner peripheral surface on the object side X1 and an image-side step portion 102 at an end portion on the image side X2. Further, the first lens barrel 3 includes an intermediate step portion 103 between the object-side step portion 101 and the image-side step portion 102 on the inner peripheral surface in the optical axis direction X.

The object-side step portion 101 includes a support surface 105 facing the object side X1, an annular wall surface 106 that extends from an inner peripheral end of the support surface 105 to the image side X2 and faces radially inward, and a peripheral wall surface 107 that extends from an outer peripheral end of the support surface 105 to the object side X1. In the first lens barrel 3, the object side X1 of the object-side step portion 101 is a housing portion 108 that houses an outer peripheral edge portion of the lens L1. The second lens barrel 4 is disposed on the inner peripheral side of the annular wall surface 106.

The housing portion 108 includes the peripheral wall surface 107, the support surface 105, and a caulking portion 109. As illustrated in FIG. 2, the peripheral wall surface 107 faces the lens L1 from radially outside. The support surface 105 faces the end surface 11 of the lens L1 from the image side X2. The caulking portion 109 abuts the lens L1 from the object side X1 at a position overlapped with the support surface 105 when viewed from the optical axis direction X along the optical axis L of the lens L1. The caulking portion 109 is a plastically deformed portion provided by thermal caulking or the like in which an end portion of the first lens barrel 3 on the object side X1 is bent toward the inner peripheral side. Here, the outer peripheral edge portion of the lens L1 is disposed between the support surface 105 and the caulking portion 109. The first O-ring 7 is disposed between the end surface of the lens L1 on the image side X2 and the support surface 105 and is compressed in the optical axis direction X.

As illustrated in FIG. 3, on the annular wall surface 106, object-side protrusions 110 protruding radially inward are provided at a plurality of positions in the circumferential direction. In this example, the object-side protrusions 110 are provided at three positions in the circumferential direction at equal angular intervals. The object-side protrusion 110 is an object-side positioning portion that positions the second lens barrel 4 in the radial direction.

Figure 10:
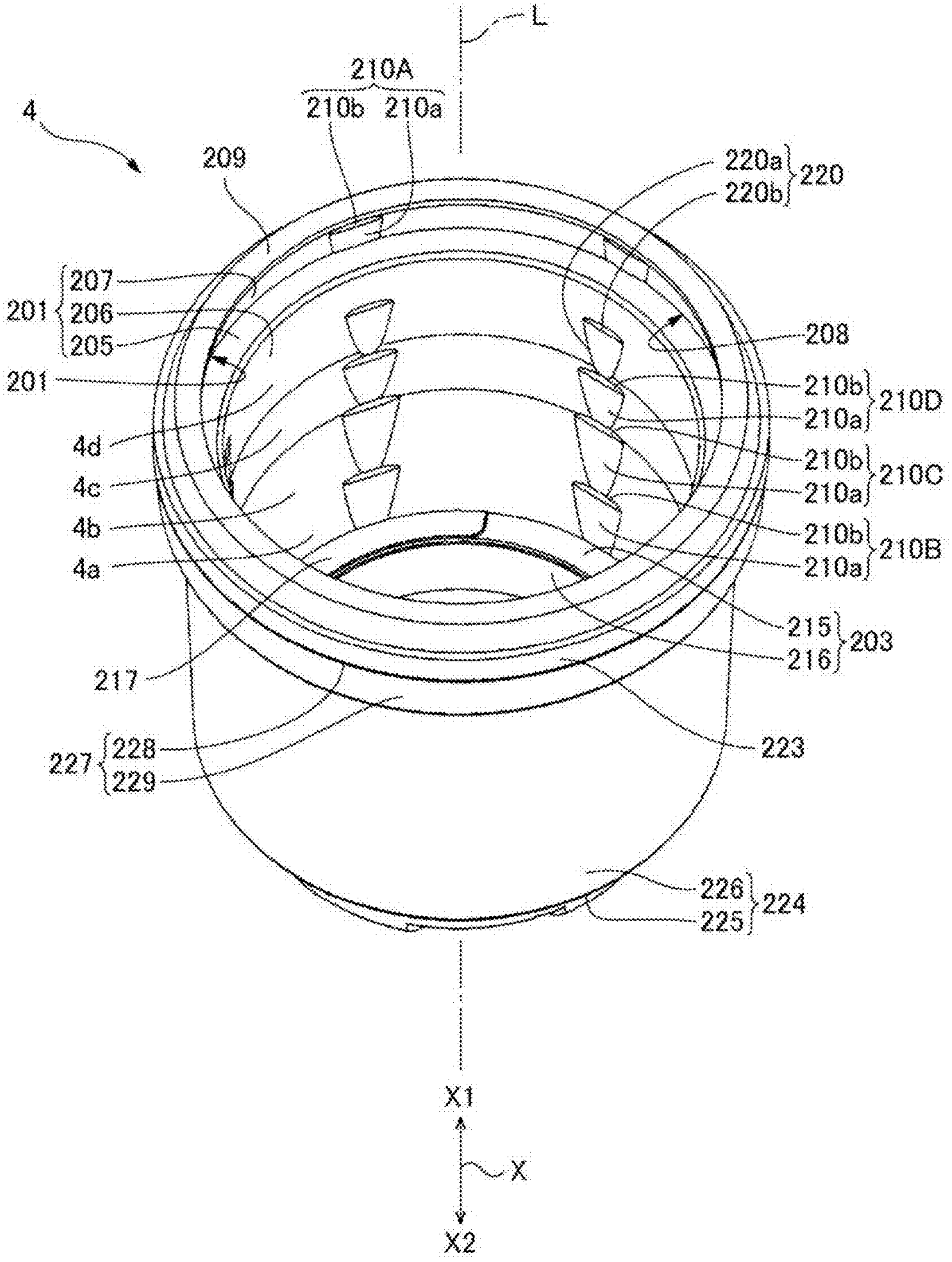
FIG. 10 is a perspective view of a second lens barrel when viewed from the object side.

As illustrated in FIGS. 3 and 10, the image-side step portion 102 includes an annular image-side end surface 112 facing the object side X1 and an annular image-side inner wall surface 113 that extends from an inner peripheral end of the image-side end surface 112 to the image side X2 and reaches the end of the first lens barrel 3 on the image side X2. The image-side end surface 112 is provided with a plurality of ribs 114 that protrudes to the object side X1 and extends in a circular arc shape in the circumferential direction. In this example, the ribs 114 are provided at three positions in the circumferential direction at equal angular intervals. The rib 114 is an image-side positioning portion that positions the second lens barrel 4 in the optical axis direction X.

The intermediate step portion 103 includes an annular step portion end surface 116 facing the object side X1 and an annular step portion wall surface 117 extending from an inner peripheral end of the step portion end surface 116 to the image side X2. In this example, the intermediate step portion 103 includes, at a plurality of positions in the circumferential direction, cutout grooves 118 that extend in the optical axis direction X and divide the step portion end surface 116 and the step portion wall surface 117 in the circumferential direction. In this example, the cutout grooves 118 are provided at three positions in the circumferential direction at equal angular intervals. Therefore, the intermediate step portion 103 is divided into three in the circumferential direction by the cutout grooves 118. The bottom surface (surface facing the inner peripheral side) of the cutout groove 118 is a tapered surface, and the inner diameter decreases toward the image side X2. As illustrated in FIG. 2, the bottom surface of the cutout groove 118 is continuous with an inner peripheral surface portion extending from an end on the outer peripheral side of the image-side end surface 112 of the image-side step portion 102 to the object side X1 in the inner peripheral surface of the first lens barrel 3.

Here, as illustrated in FIG. 3, the cutout groove 118 is provided at the same angular position as the rib 114 of the image-side step portion 102. Further, the cutout groove 118 is provided at the same angular position as the object-side protrusion 110 of the object-side step portion 101. When the first lens barrel 3 and the second lens barrel 4 disposed on the inner peripheral side of the first lens barrel 3 are connected to each other, an adhesive is applied to each of the step portion end surfaces 116 of the intermediate step portion 103 divided into three. Thus, a lens barrel connecting adhesive layer 51 is provided on the step portion end surface 116 and the step portion wall surface 117.

(Second Lens Barrel and Lenses L2 to L6)

Figure 11:
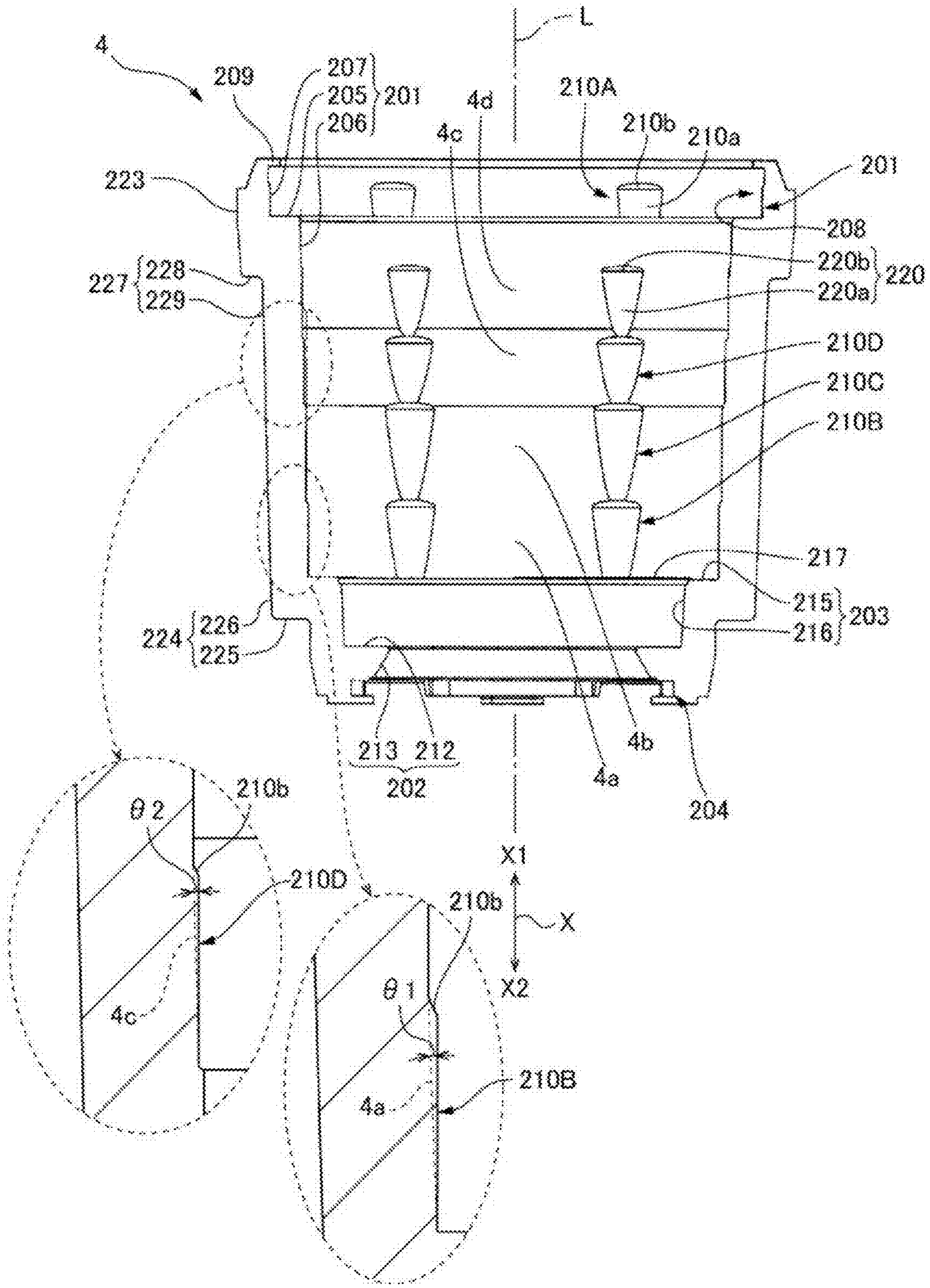
FIG. 11 is a cross-sectional view of the second lens barrel.

FIG. 10 is a perspective view of the second lens barrel 4 when viewed from the object side. FIG. 11 is a cross-sectional view of the second lens barrel 4. The regions surrounded by chain lines in FIG. 11 are partially enlarged views of the periphery of a fitting protrusion 210. The second lens barrel 4 houses the lens L2, the lens L3, the lens L4, the lens L5, the holder 28, and the lens L6 on the inner peripheral side.

As illustrated in FIGS. 10 and 11, the second lens barrel 4 includes an object-side step portion 201 at an end portion of the inner peripheral surface on the object side X1. In addition, the second lens barrel 4 includes an image-side step portion 202 at an end portion on the image side X2. Further, the second lens barrel 4 includes a positioning step portion 203 at a position between the object-side step portion 201 and the image-side step portion 202 and closer to the image-side step portion 202 than the object-side step portion 201. Furthermore, the second lens barrel 4 includes a cover holding portion 204 that holds the cover 10 at an end portion on the image side X2.

As illustrated in FIG. 11, the object-side step portion 201 includes a seat surface 205 facing the object side X1, an annular wall surface 206 extending from an inner peripheral end of the seat surface 205 to the image side X2, and a peripheral wall surface 207 extending from an outer peripheral end of the seat surface 205 to the object side X1. The annular wall surface 206 is a tapered surface whose inner diameter increases toward the object side X1. In the second lens barrel 4, the object side X1 of the object-side step portion 201 is a housing portion 208 to house the outer peripheral edge portion of the lens L2.

The housing portion 208 includes the peripheral wall surface 207, the seat surface 205, and a caulking portion 209. As illustrated in FIG. 2, the peripheral wall surface 207 faces the lens L2 from radially outside. The seat surface 205 faces the end surface of the flange portion 14 of the lens L2 on the image side X2 from the image side X2. The caulking portion 109 abuts the lens L2 from the object side X1 at a position overlapped with the seat surface 205 when viewed from the optical axis direction X.

As illustrated in FIG. 10, the peripheral wall surface 207 is a tapered surface that is inclined to the outer peripheral side toward the object side X1 from the seat surface 205. The peripheral wall surface 207 includes fitting protrusions 210A to be pressure-bonded to the lens L2 at a plurality of positions separated in the circumferential direction. In this example, the fitting protrusions 210A are provided at six positions in the circumferential direction at equal angular intervals. The fitting protrusion 210A includes a pressure bonding surface 210*a* parallel to the optical axis L at an end on the inner peripheral side. Further, the fitting protrusion 210A includes a curved surface 210*b* that is curved to the outer peripheral side from the pressure bonding surface 210*a* toward the object side X1. In the plurality of fitting protrusions 210A, the pressure bonding surface 210*a* is pressure-bonded to the lens L2 housed in the housing portion 208 from radially outside to position the lens L2 in the radial direction.

As illustrated in FIG. 11, the image-side step portion 202 includes an annular image-side end surface 212 facing the object side X1 and an image-side inner wall surface 213 extending from an inner peripheral end of the image-side end surface 212 to the image side X2. The image-side inner wall surface 213 is a tapered surface that is inclined to the outer peripheral side toward the image side X2. As illustrated in FIG. 2, the image-side end surface 212 faces the image-side lens L62 of the lens L6 with a clearance therebetween in the optical axis direction X. The cover holding portion 204 is provided on the outer peripheral side of the image-side inner wall surface 213.

As illustrated in FIGS. 10 and 11, the positioning step portion 203 includes an annular positioning surface 215 facing the object side X1 and a positioning step portion peripheral wall surface 216 extending from an inner peripheral end of the positioning surface 215 to the image side X2. The positioning surface 215 includes a plurality of positioning ribs 217 that protrudes to the object side X1 and extends in a circular arc shape in the circumferential direction. In this example, the positioning ribs 217 are provided at three positions in the circumferential direction at equal angular intervals. The lower end of the positioning step portion peripheral wall surface 216 reaches the image-side end surface 212. The positioning step portion peripheral wall surface 216 faces the image-side lens L62 of the lens L6 with a clearance therebetween in the radial direction.

As illustrated in FIG. 2, the positioning rib 217 is a positioning portion that abuts the flange portion 36 of the object-side lens L61 of the lens L6 from the image side X2 to position the lens L6 in the optical axis direction X. Here, the flange portion 36 of the object-side lens L61 of the lens L6 abuts the positioning portion, whereby the lens L3 and the stacked body 44 including the lens L4, the holder 28, the lens L5, and the lens L6 are positioned in the optical axis direction X.

More specifically, the holder 28 is supported by the lens L6 from the image side X2 to be positioned at a predetermined position in the optical axis direction X. The lens L4 is supported by the holder 28 from the image side X2 to be positioned at a predetermined position in the optical axis direction X. The lens L5 is in contact with the lens L6 to be positioned in the optical axis direction X and the radial direction. The lens L3 is fitted into the lens L4 to be positioned in the optical axis direction X and the radial direction. Here, when the lens L5 is positioned in the optical axis direction X and the radial direction, the lens L5 and the holder 28 are not in contact with each other. When the lens L3 and the lens L4 are positioned in the optical axis direction X and the radial direction, the lens L3 and the second lens barrel 4 are not in contact with each other. The lens L3, the lens L4, the holder 28, and the lens L5 are positioned between the object-side step portion 201 and the positioning step portion 203 in the optical axis direction X.

As illustrated in FIGS. 10 and 11, in the inner peripheral surface of the second lens barrel 4, an inner peripheral surface portion 4*a* radially outside the object-side lens L61 of the lens L6 is a tapered surface inclined to the outer peripheral side toward the object side X1. The inner peripheral surface portion 4*a* includes fitting protrusions 210B to be pressure-bonded to the lens L6 at a plurality of positions separated in the circumferential direction. The fitting protrusions 210B are provided at six positions in the circumferential direction at equal angular intervals. The fitting protrusion 210B includes the pressure bonding surface 210*a* parallel to the optical axis L at an end on the inner peripheral side. Further, the fitting protrusion 210B includes the curved surface 210*b* that is curved to the outer peripheral side from the pressure bonding surface 210*a* toward the object side X1. In the plurality of fitting protrusions 210B, the pressure bonding surface 210*a* is pressure-bonded to the lens L6 housed in the second lens barrel 4 from radially outside to position the lens L6 in the radial direction.

Further, in the inner peripheral surface of the second lens barrel 4, an inner peripheral surface portion 4*b* radially outside the holder 28 is a tapered surface inclined to the outer peripheral side toward the object side X1. The inner peripheral surface portion 4*b* includes fitting protrusions 210C to be pressure-bonded to the lens L6 at a plurality of positions separated in the circumferential direction. The fitting protrusions 210C are provided at six positions in the circumferential direction at equal angular intervals. The fitting protrusion 210C includes the pressure bonding surface 210*a* parallel to the optical axis L at an end on the inner peripheral side. Further, the fitting protrusion 210C includes the curved surface 210*b* that is curved to the outer peripheral side from the pressure bonding surface 210*a* toward the object side X1. In the plurality of fitting protrusions 210C, the pressure bonding surface 210*a* is pressure-bonded to the holder 28 housed in the second lens barrel 4 from radially outside to position the holder 28 in the radial direction.

Furthermore, in the inner peripheral surface of the second lens barrel 4, an inner peripheral surface portion 4*c* radially outside the lens L4 is a tapered surface inclined to the outer peripheral side toward the object side X1. The inner peripheral surface portion 4*c* includes fitting protrusions 210D to be pressure-bonded to the lens L4 at a plurality of positions separated in the circumferential direction. The fitting protrusions 210D are provided at six positions in the circumferential direction at equal angular intervals. The fitting protrusion 210D includes the pressure bonding surface 210*a* parallel to the optical axis L at an end on the inner peripheral side. Further, the fitting protrusion 210D includes the curved surface 210*b* that is curved to the outer peripheral side from the pressure bonding surface 210*a* toward the object side X1. In the plurality of fitting protrusions 210D, the pressure bonding surface 210*a* is pressure-bonded to the lens L4 housed in the second lens barrel 4 from radially outside to position the lens L4 in the radial direction.

Further, in the inner peripheral surface of the second lens barrel 4, an inner peripheral surface portion 4*d* radially outside the lens L3 is a tapered surface inclined to the outer peripheral side toward the object side X1. The inner peripheral surface portion 4*d* radially outside the lens L3 is continuous with the image side X2 of the annular wall surface 206 of the object-side step portion 201 without a step. The inner peripheral surface portion 4*d* includes guide protrusions 220 that guide the lens L3 in the optical axis direction X at a plurality of positions separated in the circumferential direction. The guide protrusions 220 are provided at six positions in the circumferential direction at equal angular intervals. The guide protrusion 220 includes a guide surface 220*a* parallel to the optical axis L at an end on the inner peripheral side. Further, the guide protrusion 220 includes a curved surface 220*b* that is curved to the outer peripheral side from the pressure bonding surface 210*a* toward the object side X1. When the lens L3 is fitted into the lens L4, the plurality of guide protrusions 220 is radially outside the lens L3, but the plurality of guide protrusions 220 and the lens L3 are not in contact with each other. The guide surface 220*a* of each of the guide protrusions 220 and the lens L3 face each other with a slight clearance in the radial direction.

Here, the second O-ring 8 is disposed on the object side X1 of the plurality of guide protrusions 220 and is disposed radially inside the annular wall surface 206 of the object-side step portion 201. As illustrated in FIG. 2, the second O-ring 8 is compressed in the optical axis direction X between the lens L2 housed in the housing portion 208 and the lens L3.

As illustrated in FIG. 11, a first inclination angle θ1 at which the tapered inner peripheral surface portion 4*a* radially outside the lens L6 is inclined with respect to the optical axis L is different from a second inclination angle θ2 at which the tapered inner peripheral surface portion 4*c* radially outside the lens L4 is inclined with respect to the optical axis L. That is, the inclinations of the inner peripheral surface portions 4*a* to 4*d* radially outside the respective lenses and the holder 28 may be appropriately set in accordance with the outer diameter of the respective lenses or the holder 28. In the inner peripheral surface of the second lens barrel 4, the inner peripheral surface portion 4*a* located between the object-side step portion 201 and the positioning step portion 203 is inclined to the outer peripheral side toward the object side X1 as a whole.

Next, the second lens barrel 4 includes an annular outer peripheral surface side positioning surface 223 at an end portion of the outer peripheral surface on the object side X1. The outer peripheral surface side positioning surface 223 is radially outside the housing portion 208. The outer peripheral surface side positioning surface 223 faces radially outward. Further, the second lens barrel 4 includes an outer peripheral surface image-side step portion 224 at the image side X2 portion of the outer peripheral surface. The outer peripheral surface image-side step portion 224 includes an annular surface 225 facing the image side X2 and an outer peripheral surface portion 226 extending from an outer peripheral end of the annular surface 225 to the object side X1. Furthermore, the second lens barrel 4 includes an outer peripheral surface intermediate step portion 227 between an end portion of the outer peripheral surface on the object side X1 (the outer peripheral surface side positioning surface 223) and the outer peripheral surface image-side step portion 224. The outer peripheral surface intermediate step portion 227 includes an annular surface 228 facing the image side X2 and an outer peripheral surface portion 229 extending from an inner peripheral end of the annular surface 228 to the image side X2.

Configuration of Lens 6

Figure 12:
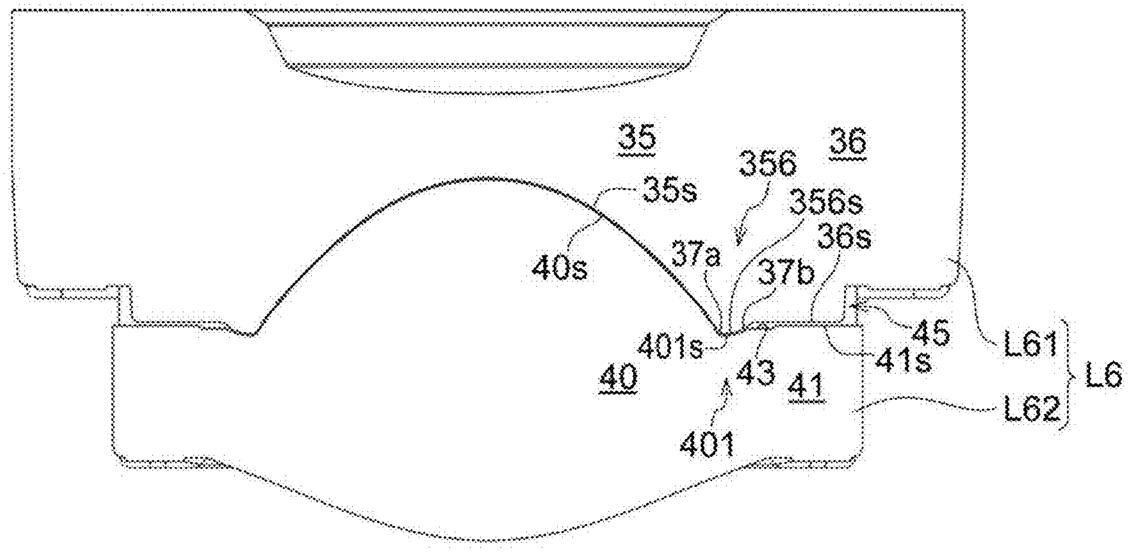
FIG. 12 is an enlarged cross-sectional view of the lens L6.
Figure 13:
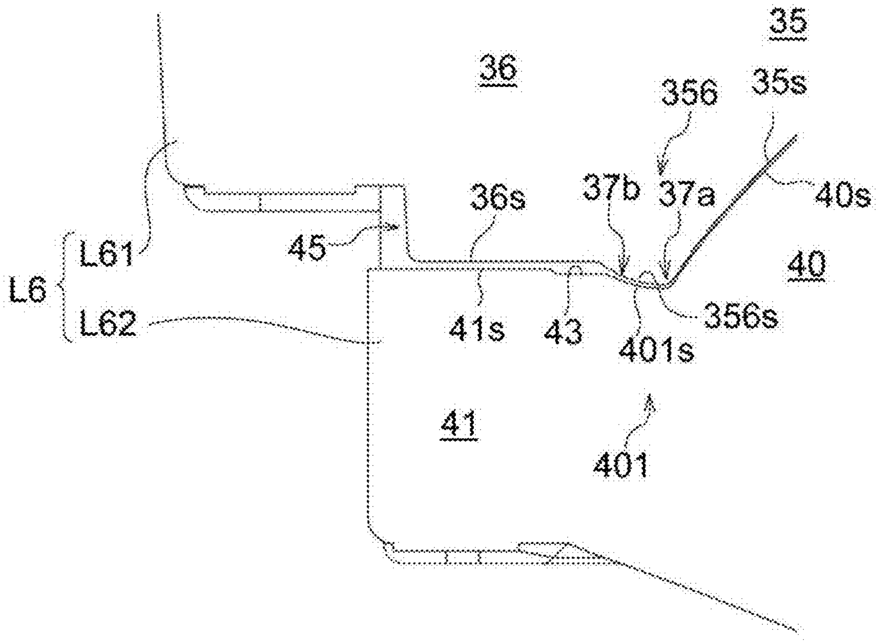
FIG. 13 is an enlarged cross-sectional view of an end portion of the lens L6.
Figure 14:
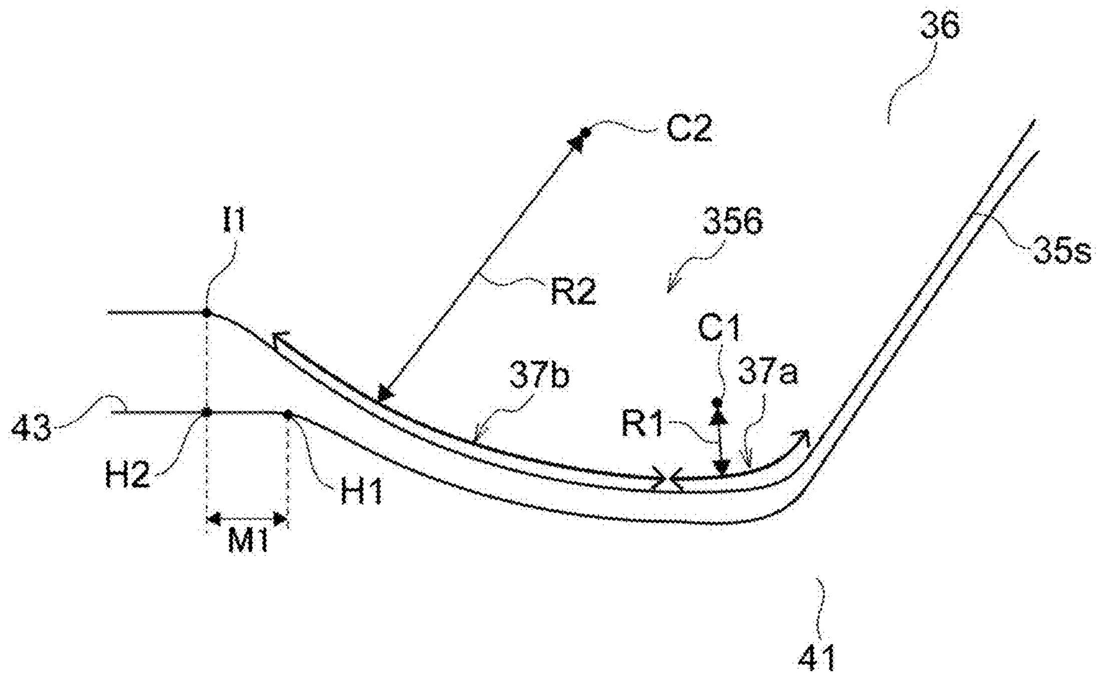
FIG. 14 is a diagram illustrating a shape of a cross section along an optical axis of a first boundary portion of an object-side lens of the lens L6.
Figure 15:
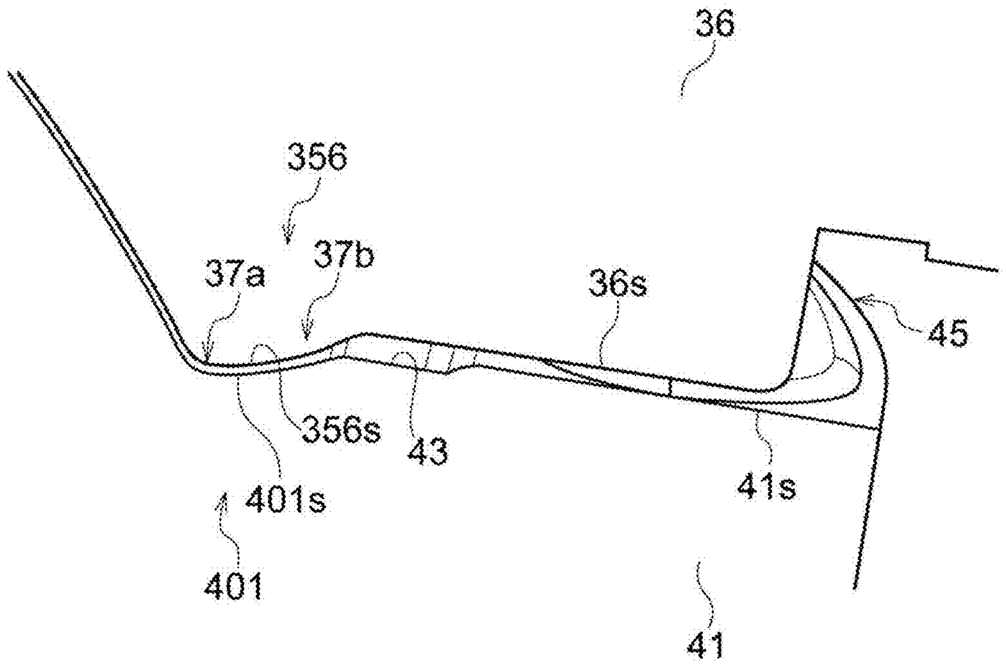
FIG. 15 is an enlarged end perspective view of the first boundary portion and a first flange surface of the object-side lens, and a second boundary portion and a second flange surface of an image-side lens.
Figure 16:
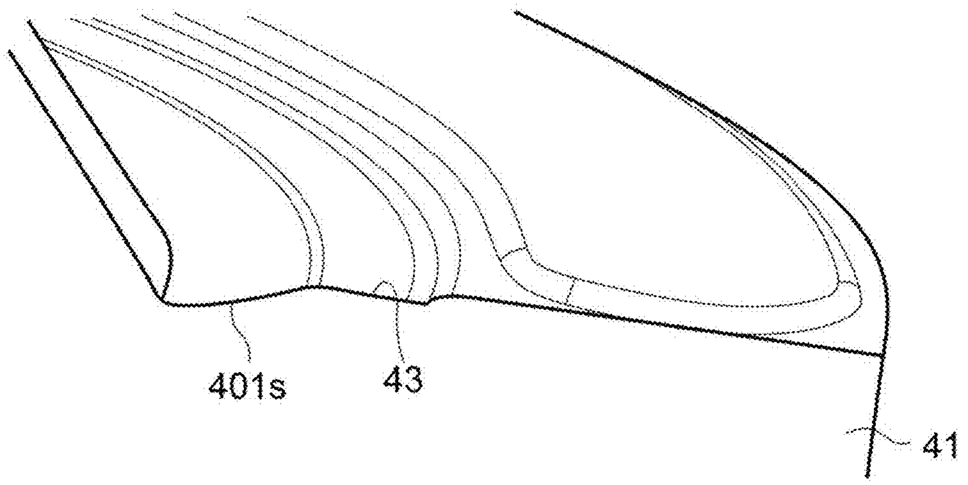
FIG. 16 is an enlarged end perspective view of the second boundary portion and the second flange surface of the image-side lens.
Figure 17A:
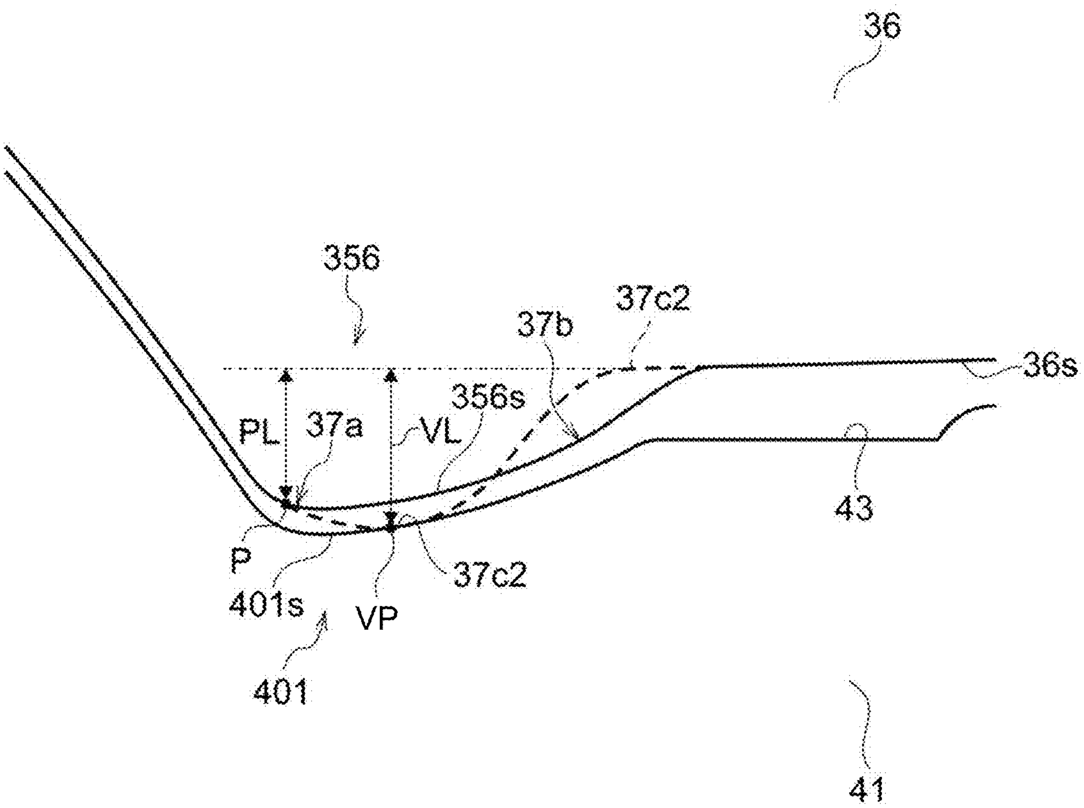
FIG. 17A is an explanatory diagram illustrating that a protrusion amount of a protrusion of the first boundary portion of the first embodiment is smaller than a protrusion amount of a protrusion of the first boundary portion of the related art.
Figure 17B:
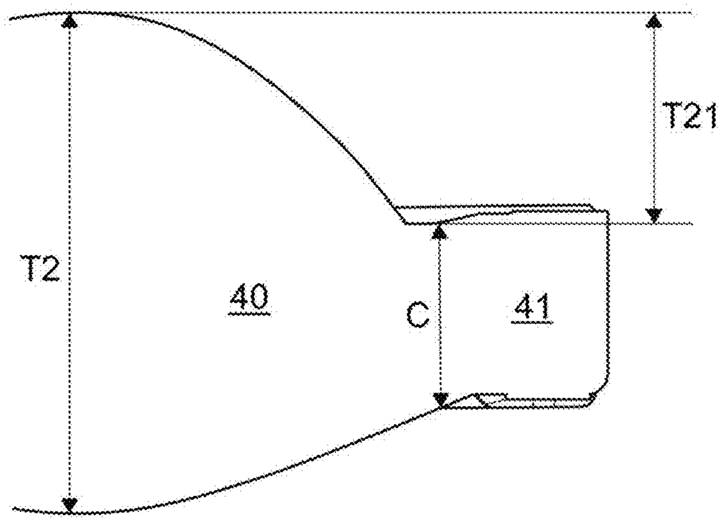
FIG. 17B is an enlarged cross-sectional view from the center to the end portion of the image-side lens.

Next, a configuration of a lens 6 will be described in detail. FIG. 12 is an enlarged cross-sectional view of the lens L6. FIG. 13 is an enlarged cross-sectional view of an end portion of the lens L6. FIG. 14 is a diagram illustrating a shape of a cross section along an optical axis of a first boundary portion 356 of the object-side lens L61 of the lens L6. FIG. 15 is an enlarged end perspective view of the first boundary portion 356 and a first flange surface 36S of the object-side lens L61, and a second boundary portion 401 and a second flange surface 41S of the image-side lens L62. FIG. 16 is an enlarged end perspective view of the second boundary portion 401 and the second flange surface 41S of the image-side lens L62. FIG. 17A is an explanatory diagram illustrating that a protrusion amount of a protrusion of the first boundary portion 356 of the first embodiment is smaller than a protrusion amount of a protrusion of the first boundary portion 356 of the related art. FIG. 17B is an enlarged cross-sectional view from the center to the end portion of the image-side lens L62.

As illustrated in FIGS. 12 and 13, the lens L6 is a cemented lens in which the object-side lens L61 and the image-side lens L62 are cemented together with an adhesive layer. As described above, the object-side lens L61 includes the lens body portion 35 having the lens surface and the flange portion 36 surrounding the lens body portion 35, and the image-side lens L62 includes the lens body portion 40 having the lens surface and the flange portion 41 surrounding the lens body portion 40.

The object-side lens L61 includes, on the side cemented to the image-side lens L62, an either convex or concave first lens surface 35*s*, a first flange surface 36*s* provided on the outer peripheral edge of the first lens surface 35*s*, and the first boundary portion 356 between the first lens surface 35*s* and the first flange surface 36*s*.

The image-side lens L62 includes, on the side cemented to the object-side lens L61, an either convex or concave second lens surface 40*s*, a second flange surface 40*s* provided on the outer peripheral edge of the second flange surface 40*s*, and the second boundary portion 401 between the second flange surface 40*s* and the second flange surface 41*s*.

In the first embodiment, the first lens surface 35*s* of the object-side lens L61 is a concave lens surface that is concave toward the object side X1, and the second lens surface 40*s* of the image-side lens L62 is a convex lens surface that is convex toward the object side X1.

As illustrated in FIGS. 12 to 17A, a recess 43 is provided in at least one of the first boundary portion 356 and the second boundary portion 401, in the second boundary portion 401 in the first embodiment. As described above, the object-side lens L61 and the image-side lens L62 are made of resins. The object-side lens L61 and the image-side lens L62 are each manufactured by injecting resin into a mold and performing injection molding. The mold is constituted by a plurality of inserts, and fine burrs may be formed at the boundary portion between the inserts. In the first embodiment, a boundary portion between the inserts is disposed near the recess 43. When the burrs are generated, it becomes difficult for the adhesive for bonding the object-side lens L61 and the image-side lens L62 to flow to the radially outside. Accordingly, in the first embodiment, the recess 43 which is one step lower than the flange surface 41*s* is provided to smooth the outflow of the adhesive.

As illustrated in FIGS. 12 to 15 and 17A, a surface 356*s* (protrusion) of the first boundary portion 356 protrudes toward the image side X2, and a surface 401*s* (recess) of the second boundary portion 401 is recessed toward the image side X2. The cross section including the optical axis of the first boundary portion 356 includes a plurality of, in the first embodiment, two circular arc shapes (37*a* and 37*b*). The plurality of circular arc shapes 37*a* and 37*b* are connected to each other at their ends. As illustrated in FIG. 14, the two circular arc shapes include a first circular arc shape 37*a* having one end connected to the first lens surface 35*a* and the other end, and a second circular arc shape 37*b* having one end connected to the other end of the first circular arc shape 37*a*. The other end of the second circular arc shape 37*b* is located at a position I on the image side X2 in the optical axis direction of a position H2 on the radially outside by a predetermined distance M1 from an end H1 radially inside the recess 43. The first circular arc shape 37*a* is defined by a first radius R1. The second circular arc shape 37*b* is defined by a second radius R2. The second radius R2 is longer than the first radius R1 (R2>R1). A center of curvature C1 of the first circular arc shape 37*a* and a center of curvature C2 of the second circular arc shape 37*b* are located in the first boundary portion 356. Note that a circular arc is a portion of a circumference sectioned by two points on the circumference.

As illustrated in FIG. 17A, in a case where the cross section including the optical axis of the first boundary portion 356 has a circular arc shape with a single radius, and the position of an apex of the circular arc shape is a virtual position VP. Meanwhile, in the first embodiment, in the plurality of circular arc shapes 37*a* and 37*b*, the position of the actual apex of the cross section including the optical axis of the first boundary portion 356, to be specific, the position of the first circular arc shape 37*a* closest to the second boundary portion 401 is a position P. In the first embodiment, a distance PL between the position P and the first flange surface 36*s* in the optical axis direction is shorter than a distance VL between the virtual position VP and the first flange surface 36*s* in the optical axis direction. The protrusion amount of the protrusion in the first boundary portion 356 can be made smaller than in the case where the cross section including the optical axis of the first boundary portion 356 has a circular arc shape with a single radius. Therefore, it is possible to improve the thickness deviation ratio (the ratio of the difference between the longest portion and the shortest portion in the optical axis direction) of the object-side lens L61.

The object-side lens L61 and the image-side lens L62 are cemented by the adhesive layer. The object-side lens L61 and the image-side lens L62 are separated from each other by a certain distance. In the case where the cross section of the first boundary portion 356 including the optical axis has a circular arc shape with a single radius, the image-side lens L62 is separated from the position (virtual position) VP of the apex of the circular arc shape by a certain distance. If the protrusion amount of the protrusion in the first boundary portion 356 can be made smaller than that in the case where the cross section including the optical axis of the first boundary portion 356 has a circular arc shape with a single radius, the second boundary portion 401 can be positioned closer to the first boundary portion 356. Therefore, the thickness deviation ratio of the image-side lens L62 can be improved.

As illustrated in FIG. 17B, in the first lens surface 35*s* and the second lens surface 40*s*, if a center thickness of the image-side lens L62 with a convex lens surface in the optical axis direction is T2, and a length of a thinnest part of the image-side lens L62 in the optical axis direction is C, then T2 and C satisfy the following formula (1).

$$2.0<T2/C<3.2 \quad (1)$$

As indicated in the above formula (1), since the value is equal to or greater than the lower limit, it is possible to make the second lens surface 40*s* (convex lens surface) of the image-side lens L62 significantly protrude. Therefore, it is possible to effectively reduce aberration such as chromatic aberration.

As indicated in the above formula (1), since the value is less than the upper limit, when the image-side lens L62 is molded, the distance in the optical axis direction from the gate mark generated on the side surface of the flange portion 41 of the image-side lens L62 to the apex of the second lens surface 40*s* of the image-side lens L62 is limited. Therefore, since the injection pressure at the time of resin-molding is properly transmitted to the apex of the second lens surface 40*s* (convex lens surface), it is possible to prevent the forming accuracy from being lowered due to the sink mark or the like. The gate refers to an inlet portion for allowing a resin to flow into a molding portion (lens) in the mold. Although the gate is cut, the mark remains.

Further, if a distance between an apex of the convex second lens surface 40*s* of the image-side lens L62 and the second flange surface 41*s* of the image-side lens L62 in the optical axis direction is T21, then, T21 and C satisfy the following formula (2).

$$T21/C<1.5 \quad (2)$$

As illustrated in FIGS. 12, 13 and 15, a retention portion 45 that retains an adhesive that is disposed on one of the object-side lens L61 and the image-side lens L62 and that flows out when the other one of the object-side lens L61 and the image-side lens L62 is superimposed on one of the lenses is provided radially outside a flange surface of one of the lenses. In the first embodiment, the retention portion 45 is provided radially outside the first flange surface 36*s*. To be specific, in a state where the object-side lens L61 is positioned in such a manner that the first lens surface 35*s* faces upward, a certain amount of adhesive is placed on the first lens surface 35*s*. In this state, the image-side lens L62 is disposed in such a manner that the second lens surface 40*s* of the image-side lens L62 is cemented to the first lens surface 35*s* of the object-side lens L61. Thus, the adhesive rises along the first lens surface 35*s* of the object-side lens L61, and flows out between the first boundary portion 356 and the second boundary portion 401 and between the first flange surface 36*s* and the second flange surface 41*s*. Since the object-side lens L61 is positioned in such a manner that the first lens surface 35*s* faces upward as described above, the adhesive that flows out between the first flange surface 36*s* and the second flange surface 41*s* further flows out to the retention portion 45 provided radially outside the first flange surface 36*s*, and is retained in the retention portion 45.

Assembly of Lens Unit

Figure 18:
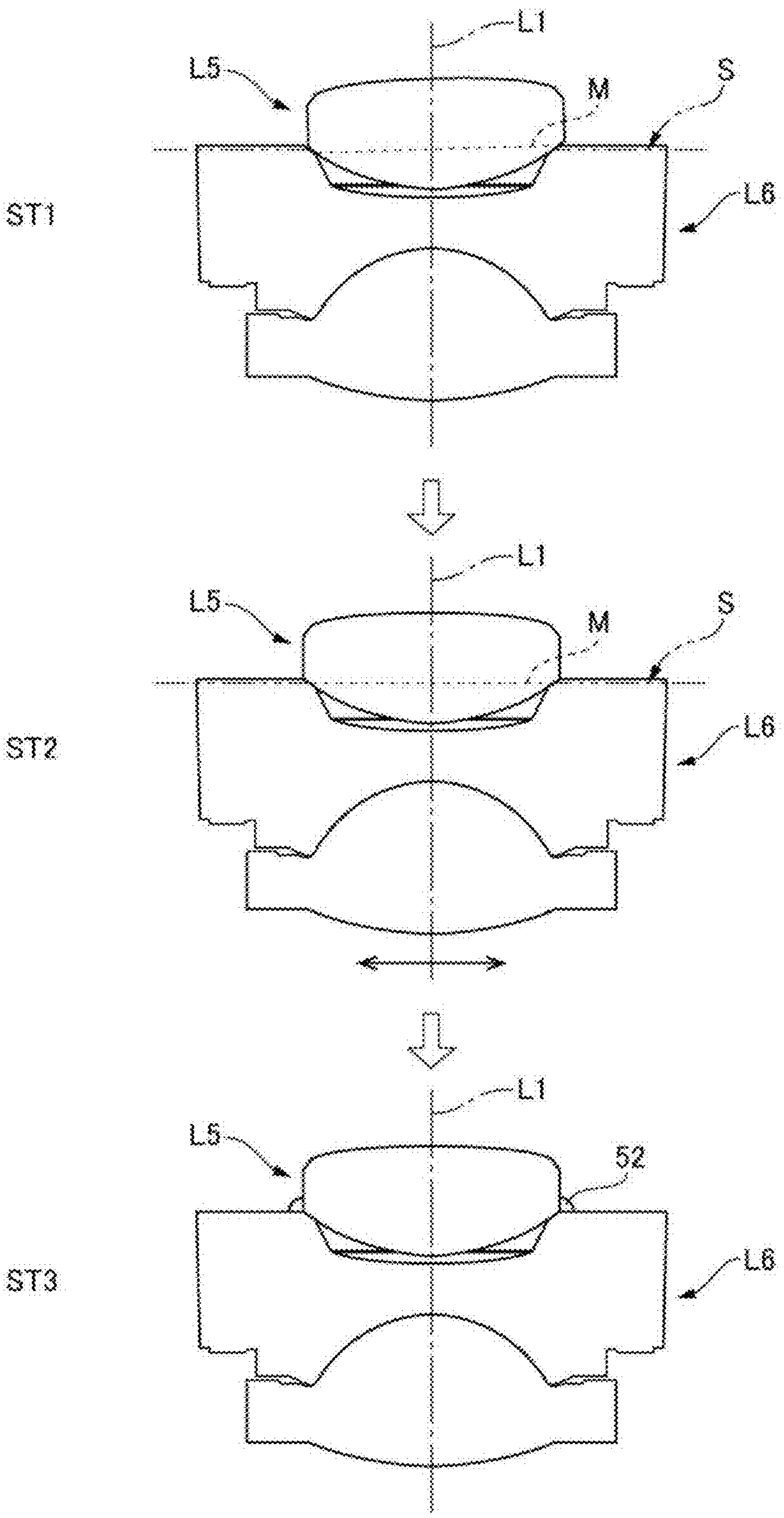
FIG. 18 is an explanatory diagram of a method for aligning the object-side lens and the image-side lens.

FIG. 18 is an explanatory diagram of a method for aligning the lens L6 and the lens L5. When the lens unit 1 is assembled, first, a second unit assembling operation is performed to house the lenses L2 to L6 in the second lens barrel 4. Next, a lens barrel fixing operation is performed to hold and fix the second lens barrel 4 to the first lens barrel 3. Then, a first unit assembling operation is performed to house the lens L1 in the first lens barrel 3.

In the second unit assembling operation, as illustrated in FIG. 18, first, the lens L5 is stacked on the lens L6 outside the second lens barrel 4, and the contacting portion 26 of the lens L5 and the contacted portion 37 of the lens L6 are brought into line contact with each other (step ST1). Thereafter, the lens L6 is vibrated until the annular contact line M along which the contacting portion 26 and the contacted portion 37 are in contact with each other is located on the virtual perpendicular plane S that is coaxial with the optical axis L and is perpendicular to the optical axis L (step ST2). Here, when the annular contact line M along which the contacting portion 26 and the contacted portion 37 are in contact with each other is located on the virtual perpendicular plane S that is coaxial with the optical axis L and is perpendicular to the optical axis L, the lens L5 and the lens L6 are aligned. That is, the lens L5 and the lens L6 are relatively positioned in the optical axis direction X and the radial direction.

After the alignment is completed, an adhesive is applied between the lens L1 and the lens L2 on the outer peripheral side of the contact line M. Further, the adhesive is cured. Thus, the lens L6 and the lens L5 are fixed by an adhesive layer 52 formed therebetween (step ST3).

Next, the lens L5 and the lens L6, which are fixed to each other, are housed in the second lens barrel 4 from the object side X1. At this time, as can be seen from FIG. 10, the lens L6 is press-fitted to the inner peripheral side of the plurality of fitting protrusions 210B provided closest to the image side X2 on the inner peripheral surface of the second lens barrel 4. Thus, the pressure bonding surface 210*a* of each of the fitting protrusions 210B is pressure-bonded to the lens L6 (the object-side lens L61) from radially outside, and the lens L6 is positioned in the radial direction. Further, the flange portion 36 of the object-side lens L61 of the lens L6 abuts the positioning rib 217 of the positioning step portion 203 of the second lens barrel 4. Thus, the lens L6 is positioned in the optical axis direction X. When the lens L6 is positioned in the optical axis direction X and the radial direction, the lens L5 fixed to the lens L6 is also positioned in the optical axis direction X and the radial direction.

Then, the holder 28 is housed in the second lens barrel 4 from the object side X1. At this time, the holder 28 is press-fitted to the inner peripheral side of the plurality of fitting protrusions 210C, which are the second from the image side X2, on the inner peripheral surface of the second lens barrel 4. Thus, the pressure bonding surface 210*a* of each of the fitting protrusions 210C is pressure-bonded to the holder 28 from radially outside, and the holder 28 is positioned in the radial direction. Further, the holder 28 abuts the lens L6 from the object side X1, and thus the holder 28 is supported by the lens L6 from the image side X2 and is positioned in the optical axis direction X. Here, the clearance 28*a* is formed between the inner peripheral surface of the holder 28 and the lens L5. Therefore, an adhesive is dropped into the clearance 28*a* to fix the holder 28 and the lens L5 via an adhesive layer 53 (see FIG. 8). In this example, an adhesive is applied to the cutout portion 31 provided at the outer peripheral portion 30 of the holder 28. Thus, the adhesive passes through the central portion 29 and reaches the clearance 28*a* between the inner peripheral surface of the holder 28 and the lens L5.

Thereafter, the lens L4 is housed in the second lens barrel 4 from the object side X1. At this time, the lens L4 is press-fitted to the inner peripheral side of the plurality of fitting protrusions 210D, which are the third from the image side X2, on the inner peripheral surface of the second lens barrel 4. Thus, the pressure bonding surface 210*a* of each of the fitting protrusions 210D is pressure-bonded to the lens L4 from radially outside, and the lens L4 is positioned in the radial direction. Further, the lens L4 abuts the holder 28 from the object side X1, and thus the lens L4 is supported by the holder 28 from the image side X2 and is positioned in the optical axis direction X. Here, the stacked body 44 including the lens L4, the holder 28, the lens L5, and the lens L6 is formed inside the second lens barrel 4.

Next, the lens L3 is housed in the second lens barrel 4 from the object side X1. At this time, the lens L3 is inserted into the inner peripheral side of the plurality of guide protrusions 220. Thus, the lens L3 is guided in the optical axis direction X in a predetermined posture, and the fitting portion 18 of the lens L3 is inserted into the fitted portion 22 of the lens L4. Further, the lens L3 guided by the guide protrusions 220 is pushed into the lens L4 from the object side X1. Accordingly, the fitting portion 18 of the lens L3 and the fitted portion 22 of the lens L4 are fitted into each other. In a state where the fitting portion 18 of the lens L3 and the fitted portion 22 of the lens L4 are fitted into each other, the fitting portion tapered surface 18*a* of the fitting portion 18 and the fitted portion tapered surface 22*a* of the fitted portion 22 are in surface contact with each other. Thus, the lens L3 is positioned in the radial direction with respect to the lens L4. Further, in a state where the fitting portion 18 of the lens L3 and the fitted portion 22 of the lens L4 are fitted into each other, the outer peripheral side portion of the fitting portion 18 in the flange portion 17 of the lens L3 and the outer peripheral side portion of the fitted portion 22 in the flange portion 21 of the lens L4 are in contact with each other in the optical axis direction X. Thus, the lens L3 is positioned in the optical axis direction X.

Then, the second O-ring 8 is placed on the flange portion 17 of the lens L3 from the object side X1. Next, the light shielding sheet 9 is supported by the support surface 105. Further, the lens L2 is supported by the support surface 105 via the light shielding sheet 9. At this time, the lens L2 is press-fitted to the inner peripheral side of the fitting protrusion 210A located closest to the object side X1 on the inner peripheral surface of the second lens barrel 4. Thus, the pressure bonding surface 210*a* of each of the fitting protrusions 210A is pressure-bonded to the lens L2 from radially outside, and the lens L2 is positioned in the radial direction. Further, the lens L2 abuts the light shielding sheet 9 from the object side X1, and thus the lens L2 is positioned in the optical axis direction X.

Thereafter, the caulking portion 109, which is bent to the inner peripheral side, is formed at the end portion of the second lens barrel 4 on the object side X1, and the caulking portion 109 abuts the outer peripheral edge portion of the lens L2 from the object side X1. In this example, the caulking portion 109 is formed by thermal caulking. With this, the second unit assembling operation is completed. In a state where the second unit assembling operation is completed, the second O-ring 8 is compressed between the lens L2 and the lens L3 in the optical axis direction X.

Next, the lens barrel fixing operation is performed to hold the second unit 60 on the first unit 50. In the lens barrel fixing operation, as can be seen from FIGS. 3 and 9, an adhesive is applied to each of the step portion end surfaces 116 of the three intermediate step portions 103 provided on the inner peripheral surface of the first lens barrel 3. Thereafter, the second unit 60 is inserted into the inner peripheral side of the first lens barrel 3 from the object side X1. Then, as can be seen from FIGS. 11 and 9, the annular surface 225 of the outer peripheral surface image-side step portion 224 provided at the image-side portion of the outer peripheral surface of the second lens barrel 4 abuts the rib 114 (image-side positioning portion) of the image-side step portion 102 provided on the inner peripheral surface of the first lens barrel 3. Further, the annular outer peripheral surface side positioning surface 223 provided at the end portion of the second lens barrel 4 on the object side X1 abuts the object-side protrusion 110 provided at the annular wall surface 106 of the object-side step portion 101 of the first lens barrel 3.

Here, the inner peripheral surface of the first lens barrel 3 and the outer peripheral surface of the second lens barrel 4 face each other with a clearance except for a contacting portion between the image-side step portion 102 of the second lens barrel 4 and the image-side step portion 102 of the first lens barrel 3 and a contacting portion between the annular positioning surface 215 of the second lens barrel 4 and the object-side step portion 101 of the first lens barrel 3. Therefore, the second lens barrel 4 is positioned in the optical axis direction X and the radial direction with respect to the first lens barrel 3 by the two contacting portions.

Further, when the second unit 60 is inserted into the inner peripheral side of the first lens barrel 3, the intermediate step portion 103 on the inner peripheral surface of the first lens barrel 3 and the outer peripheral surface intermediate step portion 227 on the outer peripheral surface of the second lens barrel 4 face each other with a clearance therebetween. That is, the step portion end surface 116 of the intermediate step portion 103 of the first lens barrel 3 and the annular surface 228 of the outer peripheral surface intermediate step portion 227 of the second lens barrel 4 face each other with a clearance therebetween in the optical axis direction X. Further, the step portion wall surface 117 of the intermediate step portion 103 of the first lens barrel 3 and the outer peripheral surface portion 229 of the outer peripheral surface intermediate step portion 227 of the second lens barrel 4 face each other with a clearance in the radial direction. Here, the adhesive applied to the step portion end surface 116 of the intermediate step portion 103 of the first lens barrel 3 spreads to the step portion wall surface 117 when the second unit 60 is inserted into the inner peripheral side of the first lens barrel 3. Therefore, as illustrated in FIG. 2, the lens barrel connecting adhesive layer 51 is interposed between the step portion end surface 116 of the intermediate step portion 103 of the first lens barrel 3 and the annular surface 228 of the outer peripheral surface intermediate step portion 227 of the second lens barrel 4. Further, the lens barrel connecting adhesive layer 51 is interposed between the step portion wall surface 117 of the intermediate step portion 103 of the first lens barrel 3 and the outer peripheral surface portion 229 of the outer peripheral surface intermediate step portion 227 of the second lens barrel 4. The intermediate step portion 103 of the first lens barrel 3 and the outer peripheral surface intermediate step portion 227 of the second lens barrel 4 are adhesive fixing portions that connect the first lens barrel 3 and the second lens barrel 4 via the lens barrel connecting adhesive layer 51.

Next, in the first unit assembling operation, the first O-ring 7 is placed on the support surface 105 of the first lens barrel 3. Then, the lens L1 is supported by the support surface 105 via the first O-ring 7. Thereafter, the caulking portion 109, which is bent to the inner peripheral side, is formed at the end portion of the first lens barrel 3 on the object side X1. Thus, the caulking portion 109 abuts the outer peripheral edge portion of the lens L1 from the object side X1. In this example, the caulking portion 109 is formed by thermal caulking. When the caulking portion 109 is formed, the first O-ring 7 is compressed in the optical axis direction X between the end surface of the lens L1 on the image side X2 and the support surface 105 of the first lens barrel 3.

Here, when the lens L1 is held by the first lens barrel 3, the annular protruding portion 15 provided at the flange portion 14 of the lens L2 held by the second lens barrel 4 is in surface contact with the end surface 11 of the lens L1 on the image side X2.

Further, as illustrated in FIG. 2, an air passage 70 is formed between the first lens barrel 3 and the second lens barrel 4, and the air passage 70 passes the gap between an end 3*a* of the first lens barrel 3 on the image side X2 and an end 4*e* of the second lens barrel 4 on the image side X2, the gap between the ribs 114 adjacent to each other in the circumferential direction in the image-side step portion 102 of the first lens barrel 3, the cutout groove 118 provided at the intermediate step portion 103 of the first lens barrel 3, and the gap between the object-side protrusions 110 adjacent to each other in the circumferential direction on the annular wall surface 106 of the object-side step portion 101 of the first lens barrel 3. The air passage 70 communicates with the space between the lens L1 and the support surface 105 and on the inner peripheral side of the first O-ring 7.

Figure 19:
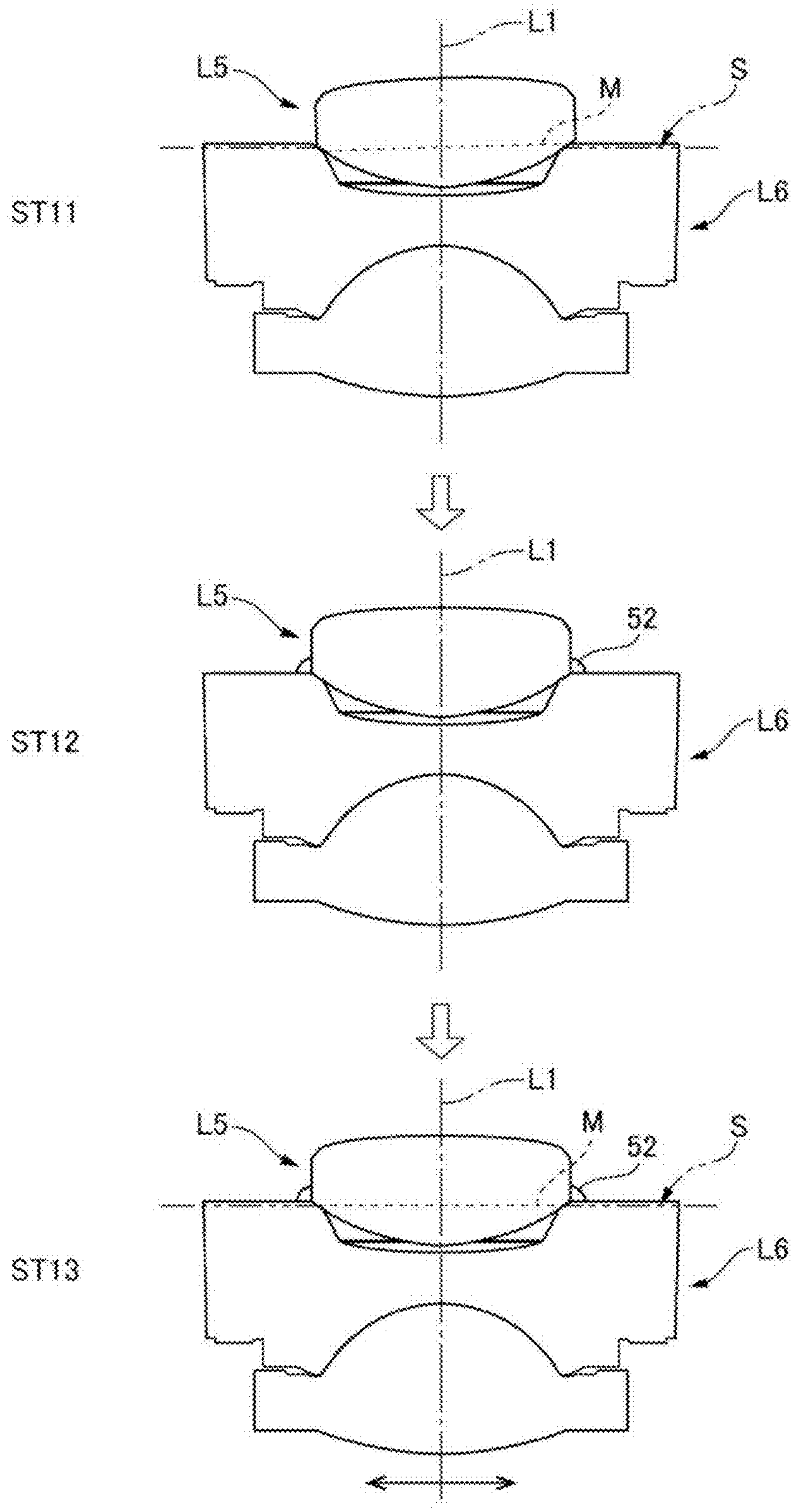
FIG. 19 is an explanatory diagram of another example of the method for aligning the object-side lens and the image-side lens.

FIG. 19 is an explanatory diagram of another example of the method for aligning the lens L6 and the lens L5. In the method for aligning the lens L6 and the lens L5 according to this example, as illustrated in FIG. 13, after the contacting portion 26 of the lens L5 and the contacted portion 37 of the lens L6 are brought into line contact with each other (step ST11), an adhesive is applied between the lens L6 and the lens L5 on the outer peripheral side of the contact line M (step ST12). Then, the lens L6 is vibrated until the annular contact line M along which the contacting portion 26 and the contacted portion 37 are in contact with each other is located on the virtual perpendicular plane S that is perpendicular to the optical axis L of the lens L6, and then the adhesive is cured (step ST13). In this case, too, one of the lens L6 and the lens L5 is vibrated, and thus the lens L6 and the lens L5 may be relatively moved to align the two lenses. Further, the lens L6 and the lens L5 may be fixed by the adhesive layer.

In the above example, the lens L6 is vibrated for alignment, but the lens L6 may be stacked on the lens L5 and the lens L5 may be vibrated for alignment.

Effect

In the first embodiment, the protrusion amount of the protrusion in the first boundary portion 356 can be made smaller than in the case where the cross section including the optical axis of the first boundary portion 356 has a circular arc shape with a single radius. Therefore, the thickness deviation ratio of the object-side lens L61 can be improved. The second boundary portion 401 can be positioned closer to the first boundary portion 356. Therefore, the thickness deviation ratio of the image-side lens L62 can be improved.

Second Embodiment

Next, a second embodiment will be described. The configuration of the second embodiment is substantially the same as that of the first embodiment, and thus the same parts are denoted by the same reference numerals, the description thereof will be omitted, and different parts will be described.

Figure 20:
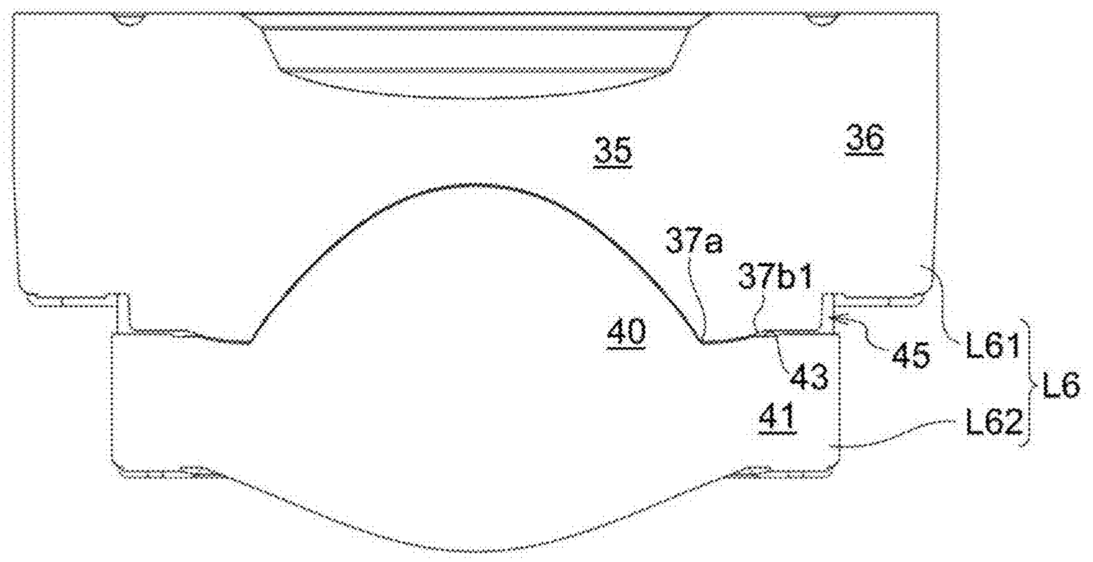
FIG. 20 is an enlarged cross-sectional view of the lens L6 of a second embodiment.
Figure 21:
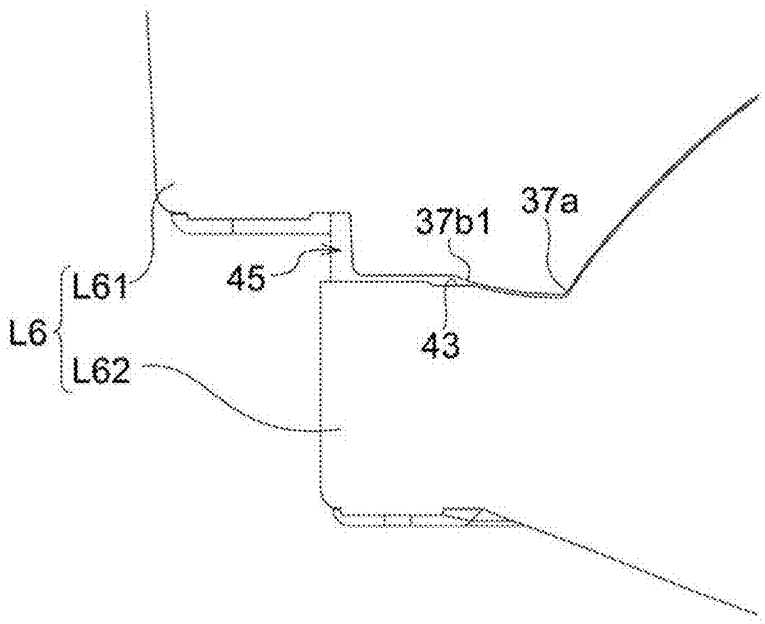
FIG. 21 is an enlarged cross-sectional view of an end portion of the lens L6 of the second embodiment.
Figure 22:
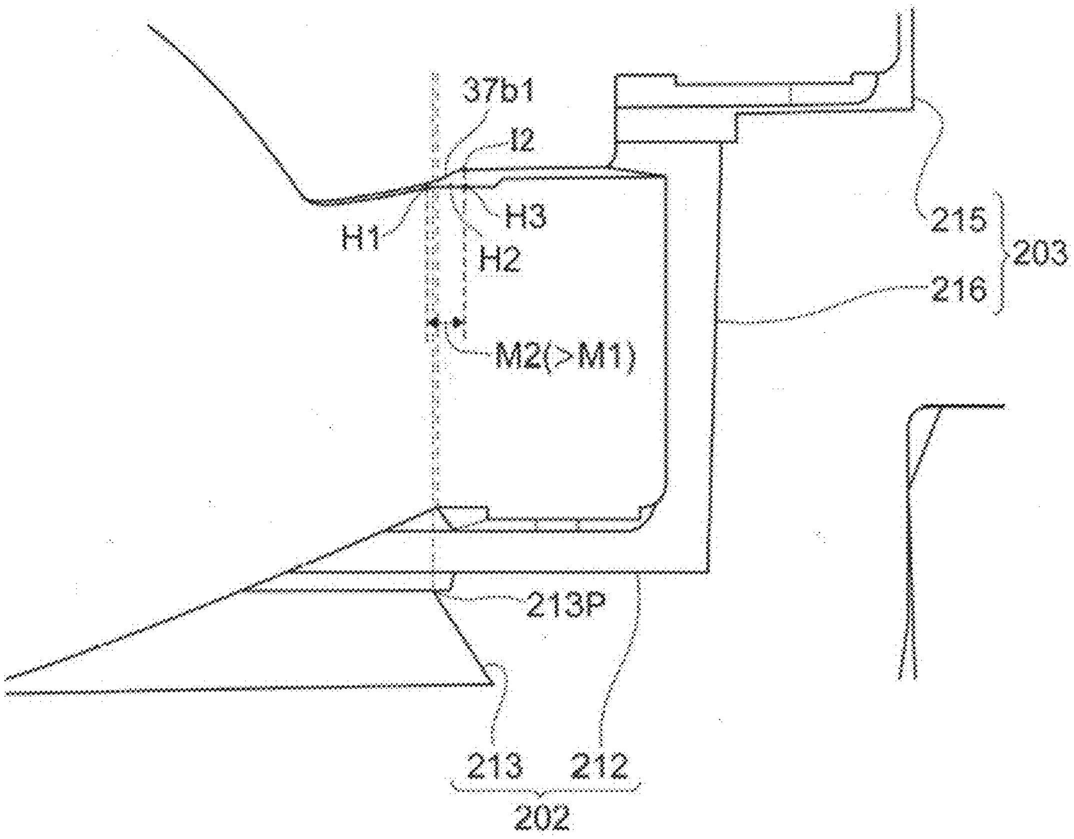
FIG. 22 is a diagram illustrating that a region of the cross section along the optical axis of the protrusion of the first boundary portion of the second embodiment is formed to the radially outside from the edge of an image-side opening portion.

FIG. 20 is an enlarged cross-sectional view of the lens L6 of the second embodiment. FIG. 21 is an enlarged cross-sectional view of an end portion of the lens L6 of the second embodiment. FIG. 22 is a diagram illustrating that a region of the cross section along the optical axis of the protrusion of the first boundary portion 356 of the second embodiment is formed radially outside an edge 213P of the image-side end surface 212 of the image-side step portion 202.

As illustrated in FIGS. 20 to 22, a second circular arc shape 37*b*1 of the second embodiment is different from the second circular arc shape 37*b* of the first embodiment in that the former is longer than the latter.

In the first embodiment described above, as illustrated in FIG. 14, the other end of the second circular arc shape 37*b* is located at a position I on the image side X2 in the optical axis direction of a position H2 on the radially outside by a predetermined distance M1 from an end H1 radially inside the recess 43.

On the other hand, in the second embodiment, as illustrated in FIG. 22, the other end of the second circular arc shape 37*b*1 is located at a position I2 on the image side X2 in the optical axis direction of a position H3 on the radially outside by a predetermined distance M2 (>M1) from the end H1 radially inside the recess 43. The position I2 is determined in such a manner that the other end of the second circular arc shape 37*b*1 is radially outside the edge 213P of the image-side end surface 212 of the image-side step portion 202 also illustrated in FIG. 11. In other words, the cross section of the first boundary portion 356 includes an outermost position in the radial direction of an imaging region of an imaging unit 300 (FIG. 28) described below. Further, the direction of the cross section of the first boundary portion 356 is determined in such a manner that the light from the imaging unit 300 and reflected at the cross section of the first boundary portion 356 travels to a region other than the imaging unit 300. As a result, the occurrence of a ghost can be suppressed.

Furthermore, in the second embodiment, if n1 is the refractive index of the object-side lens L61, n2 is the refractive index of the image-side lens L62, and n3 is the refractive index of the adhesive layer, n1, n2, and n3 satisfy the following formula (3).

$$|n2-n3|<|n1-n3| \quad (3)$$

In the second embodiment, the refractive index n1 is 1.656, the refractive index n2 is 1.486, and the refractive index n3 is 1.544, which satisfy the above formula.

The ghost is likely to occur on the surface of the lens (object-side lens L61) having a large difference in refractive index from the adhesive. Accordingly, in the second embodiment, by selecting an adhesive having a refractive index close to the refractive index of the image-side lens L62, the occurrence of ghost is suppressed even if the surface 401*s* of the second boundary portion 401 formed in the image-side lens L62 is not positioned radially outside the edge 213P of the image-side end surface 212 of the image-side step portion 202 of the lens barrel 2.

Therefore, since the object side X1 portion of the image-side lens L62 facing the edge 213P of the image-side end surface 212 can be used as the second flange surface 41*s* (the adhesive passage portion (the surface orthogonal to the optical axis)), the radius of the surface 401*s* of the second boundary portion 401 of the image-side lens L62 does not become too large. Hence, it is possible to suppress the surface 401*s* from being deeply recessed.

Third Embodiment

Next, a third embodiment will be described. The configuration of the third embodiment is substantially the same as that of the first embodiment, and thus the same parts are denoted by the same reference numerals, the description thereof will be omitted, and different parts will be described.

Figure 23:
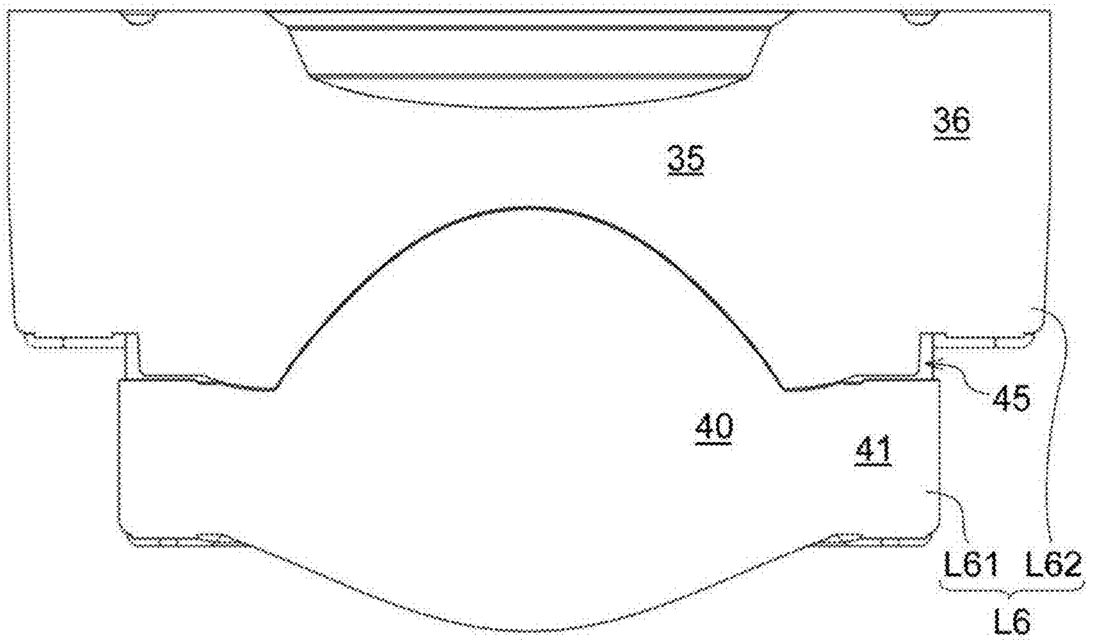
FIG. 23 is an enlarged cross-sectional view of the lens L6 of a third embodiment.
Figure 24:
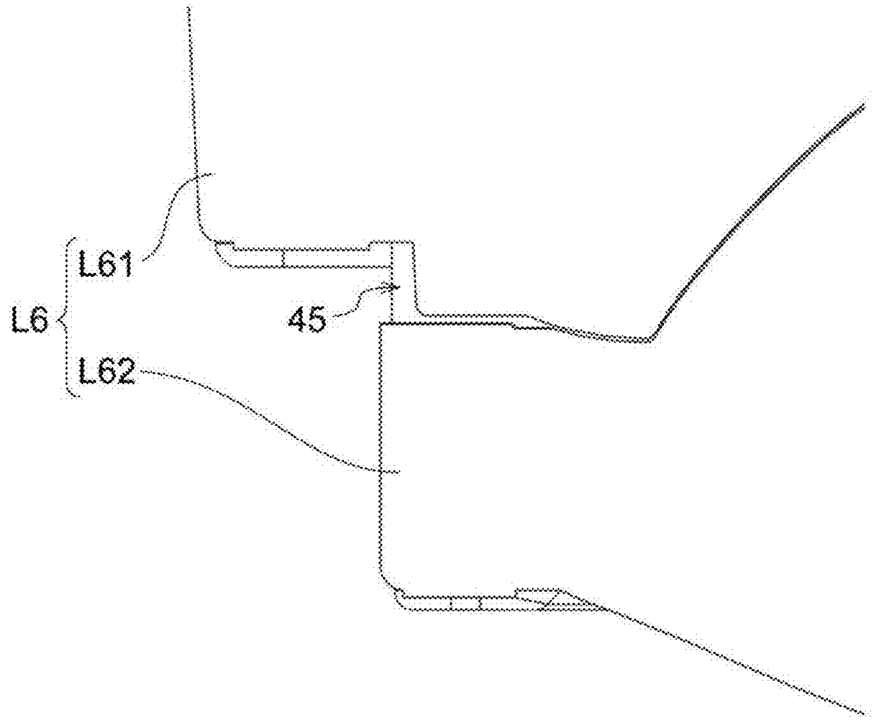
FIG. 24 is an enlarged cross-sectional view of an end portion of the lens L6 of the third embodiment.
Figure 25:
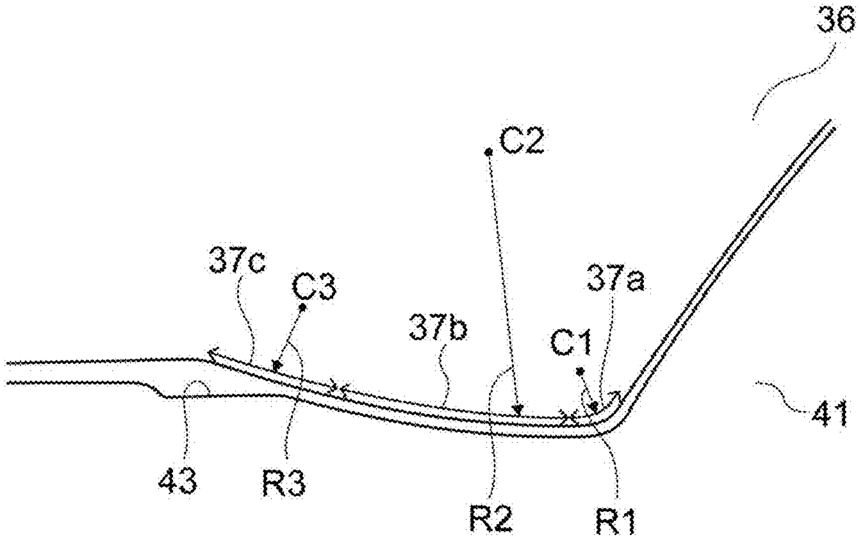
FIG. 25 is a diagram illustrating a shape of a cross section along the optical axis of the first boundary portion of the object-side lens of the lens L6 of the third embodiment.

FIG. 23 is an enlarged cross-sectional view of the lens L6 of the third embodiment. FIG. 24 is an enlarged cross-sectional view of an end portion of the lens L6 of the third embodiment. FIG. 25 is a diagram illustrating a shape of a cross section along an optical axis of the first boundary portion of the object-side lens of the lens L6 of the third embodiment.

In the first embodiment described above, as illustrated in FIG. 14, the cross section including the optical axis of the first boundary portion 356 includes two circular arc shapes (37*a* and 37*b*). Two circular arc shapes include the first circular arc shape 37*a* and the second circular arc shape 37*b*.

On the other hand, as illustrated in FIG. 25, the third embodiment is different in that the cross section of the first boundary portion 356 including the optical axis has three circular arc shapes. Three arc shapes include the first circular arc shape 37*a* having one end connected to the first lens surface 35*s* and the other end, the second circular arc shape 37*b* having one end connected to the other end of the first circular arc shape 37*a*, and a third circular arc shape 37*c* having one end connected to the other end of the second circular arc shape 37*b*. As described above, the first circular arc shape 37*a* is defined by the first radius R1, and the second circular arc shape 37*b* is defined by the second radius R2. The third circular arc shape 37*c* is defined by a third radius R3. The center of curvature C1 of the first circular arc shape 37*a*, the center of curvature C2 of the second circular arc shape 37*b*, and the center of curvature C3 of the third circular arc shape 37*c* are located in the first boundary portion 356.

In the third embodiment, as in the second embodiment, the other end of the third circular arc shape 37*c* is radially outside the edge 213P of the image-side end surface 212 of the image-side step portion 202 also illustrated in FIG. 11. In the third embodiment, as in the second embodiment, n1, n2, and n3 satisfy the above formula (3).

The third embodiment also exhibits the same effect as the second embodiment.

Variations

Next, variations will be described. The configuration of the variations is substantially the same as that of the first embodiment, and thus the same parts are denoted by the same reference numerals, the description thereof will be omitted, and different parts will be described.

Variation 1

Figure 26:
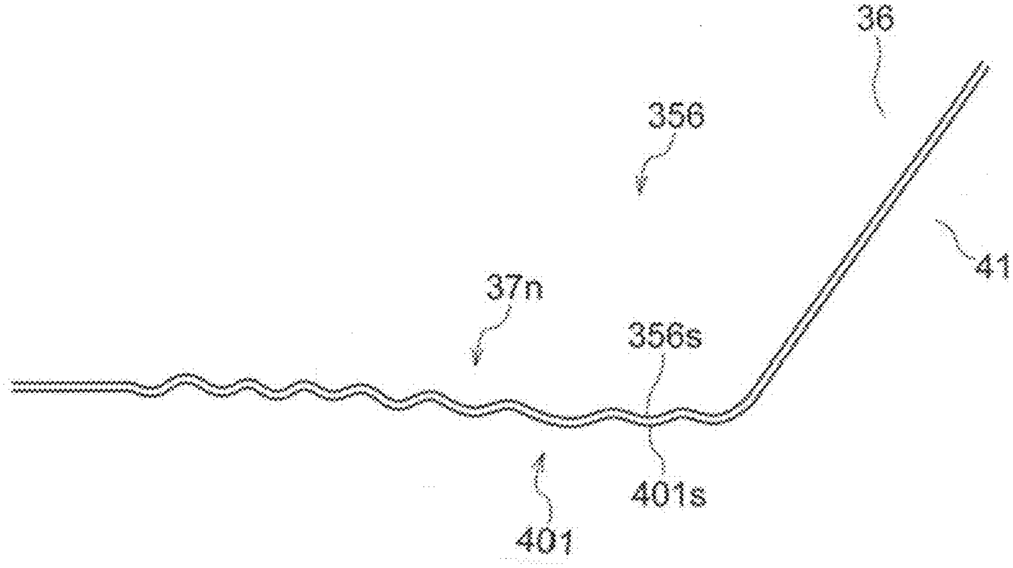
FIG. 26 is an enlarged cross-sectional view of the first boundary portion and the second boundary portion of variation 1.

FIG. 26 is an enlarged cross-sectional view of the first boundary portion 356 and the second boundary portion 401 of variation 1. As illustrated in FIG. 26, the cross section including the optical axis of the first boundary portion 356 has a large number of circular arc shapes 37*n* (the number of circular arc shapes is larger than the number of circular arc shapes in the first to third embodiments).

The circular arc shape of the cross section including the optical axis of the first boundary portion 356 and the circular arc shape of the cross section including the optical axis of the second boundary portion 401 have the same interval. The positions of the centers of curvature of the respective circular arc shapes are alternately located at the first boundary portion 356 and the second boundary portion 401 toward the radially outside.

Variation 2

Figure 27:
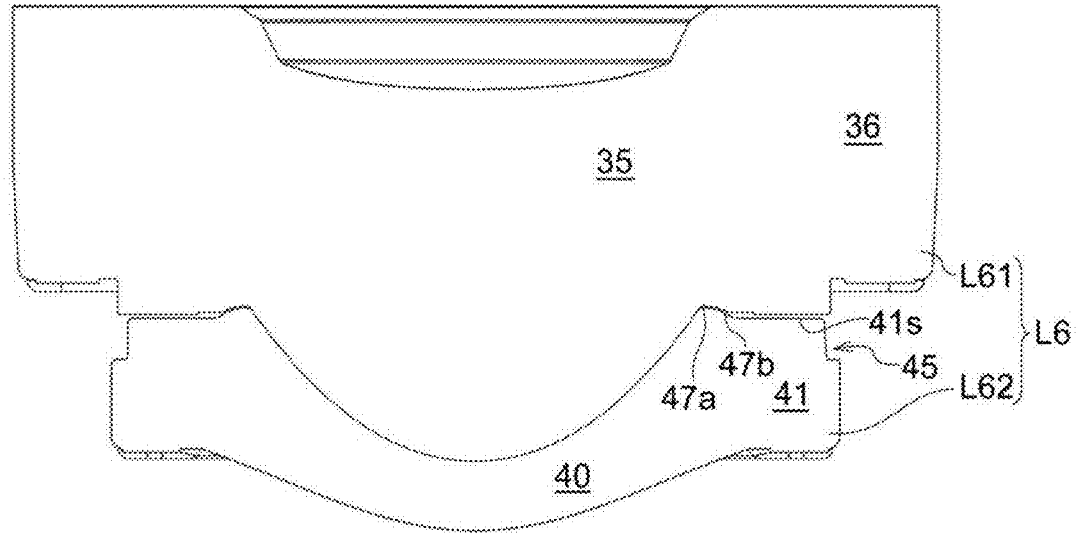
FIG. 27 is an enlarged cross-sectional view of the lens L6 of variation 2.

FIG. 27 is an enlarged cross-sectional view of the lens L6 of variation 2.

In the first embodiment described above, as illustrated in FIG. 12, the first lens surface 35*s* of the object-side lens L61 is a concave lens surface that is concave toward the object side X1, and the second lens surface 40*s* of the image-side lens L62 is a convex lens surface that is convex toward the object side X1.

On the other hand, in variation 2, as illustrated in FIG. 27, the first lens surface 35*s* of the object-side lens L61 is a convex lens surface that is convex toward the image side X2, and the second lens surface 40*s* of the image-side lens L62 is a concave lens surface that is concave toward the object side X1.

In variation 2, it is possible to reduce the recess amount of the recess in the first boundary portion 356 of the object-side lens L61 of the lens L6 which is the cemented lens.

In the first embodiment described above, the retention portion 45 is provided radially outside the first flange surface 36*s* of the object-side lens L61.

On the other hand, in variation 2, a retention portion 45H is provided radially outside the second flange surface 41*s* of the image-side lens L62.

Imaging Device

Figure 28:
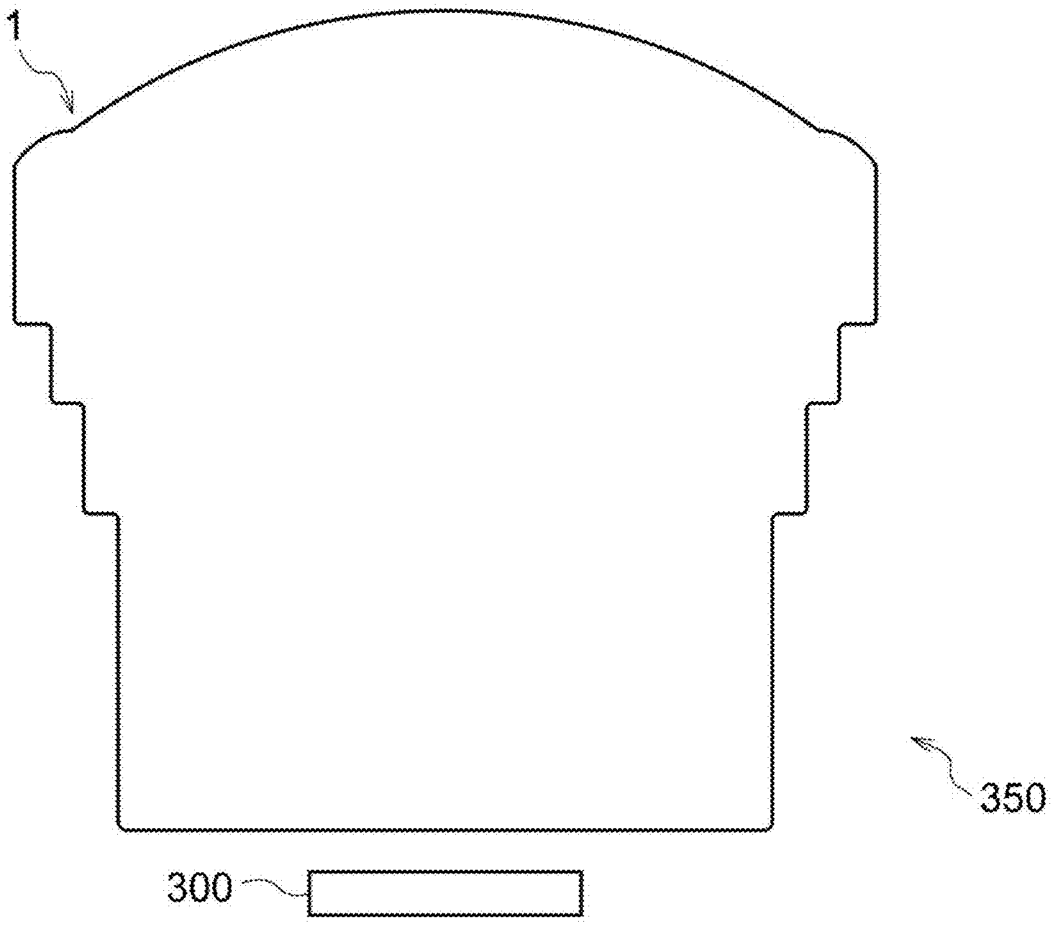
FIG. 28 is a schematic diagram of an imaging device.

FIG. 28 is a schematic diagram of an imaging device 350. As illustrated in FIG. 28, the imaging device 350 includes the lens unit 1, the imaging unit 300, and a signal processing unit that performs arithmetic processing on an output signal from the imaging unit 300. The lens unit 1 may be any one of the lens units 1 according to the first to third embodiments and variations 1 and 2.

The imaging unit 300 includes an infrared cut filter and an imaging element. The imaging element captures an image of a subject formed by the lens unit 1 and converts the image into an electric signal, and for example, a Charge Coupled Device (CCD), a Complementary Metal Oxide Semiconductor (CMOS), or the like can be used. The imaging element is disposed in such a manner that an imaging surface thereof coincides with an image plane of the lens unit 1.

The imaging device 350 can be used for, for example, an in-vehicle imaging device, specifically, a drive recorder. The imaging device 350 captures an image of the front, rear, or side of the host vehicle.

A band-pass filter may be used instead of the infrared cut filter.

Other Variations

A contacting portion of the lens L5 may be a tapered surface extending to the object side X1 toward the outer peripheral side, and a cross section of a contacted portion of the lens L6 cut along the optical axis L may be a circular arc that is curved to the outer peripheral side toward the object side X1. In this case, too, one of the first lens and the second lens is vibrated, and thus the first lens and the second lens may be relatively moved to align the two lenses.

The alignment between the lens L6 and the lens L5 may be performed in a state where these lenses are housed in the second lens barrel 4. In this case, the lens L6 is inserted into the second lens barrel 4, and the lens L6 is positioned in the optical axis direction X and the radial direction. Then, the lens L5 is stacked on the lens L6, and the contacting portion 26 of the lens L5 and the contacted portion 37 of the lens L6 are brought into line contact with each other (step ST1). Thereafter, the second lens barrel is vibrated until the annular contact line M along which the contacting portion 26 and the contacted portion 37 are in contact with each other is located on the virtual perpendicular plane S that is coaxial with the optical axis L and is perpendicular to the optical axis L. That is, the lens L6 is vibrated (step ST2). An adhesive is applied between the lens L6 and the lens L5 on the outer peripheral side of the contact line M to fix the lens L6 and the lens L5 (step ST3).

In this case, the holder 28 may be housed in the second lens barrel 4 and positioned in the optical axis direction X and the radial direction before the second lens barrel is vibrated. In this case, too, since there is a clearance between the holder 28 and the lens L5, it is possible to align the lens L6 and the lens L5.

What is claimed is:

1. A cemented lens in which an object-side lens and an image-side lens are cemented together with an adhesive layer, wherein the object-side lens comprises, on a side to be cemented to the image-side lens, a first lens surface that is either convex or concave, a first flange surface provided at an outer peripheral edge of the first lens surface, and a first boundary portion between the first lens surface and the first flange surface, wherein the image-side lens comprises, on a side to be cemented to the object-side lens, a second lens surface that is either convex or concave, a second flange surface provided at an outer peripheral edge of the second lens surface, and a second boundary portion between the second lens surface and the second flange surface, wherein a cross section including an optical axis of the first boundary portion comprises a plurality of circular arc shapes, and wherein the cross section including the optical axis of the first boundary portion has a circular arc shape with a single radius and a position of an apex of the circular arc shape is a virtual position, in the plurality of circular arc shapes, a distance between an actual apex position of the cross section and the first flange surface in a direction of the optical axis is shorter than a distance between the virtual position and the first flange surface in the direction of the optical axis, wherein the plurality of circular arc shapes comprises a first circular arc shape having a first radius and having one end connected to the first lens surface and an other end, and a second circular arc shape having a second radius longer than the first radius and having one end connected to the other end, and wherein a position of the first circular arc shape closest to the second boundary portion is the actual apex position of the cross section.

2. The cemented lens according to claim 1, wherein an end of each circular arc shape and an end of an adjacent circular arc shape are connected.

3. The cemented lens according to claim 2, wherein the plurality of circular arc shapes comprises a first circular arc shape having a first radius and having one end connected to the first lens surface and an other end, and a second circular arc shape having a second radius longer than the first radius and having one end connected to the other end, and wherein a position of the first circular arc shape closest to the second boundary portion is the actual apex position of the cross section.

4. The cemented lens according to claim 3, wherein a recess is provided in at least one of the first boundary portion and the second boundary portion.

5. The cemented lens according to claim 4, wherein an adhesive is disposed on one of the object-side lens and the image-side lens, and a retention portion that retains the adhesive that flows out when the other of the object-side lens and the image-side lens is superimposed on the one of the lenses is provided radially outside a flange surface of the one of the lenses.

6. The cemented lens according to claim 4, wherein an imaging unit is disposed on a side of the image-side lens opposite to the object-side lens, and wherein the cross section of the first boundary portion comprises an outermost position in a radial direction of an imaging region of the imaging unit.

7. The cemented lens according to claim 4, wherein a refractive index of the object-side lens is n1, a refractive index of the image-side lens is n2, and a refractive index of the adhesive layer is n3, n1, n2, and n3 satisfy a following formula:

$$|n2-n3|<|n1-n3|.$$

8. The cemented lens according to claim 4, wherein in the first lens surface and the second lens surface, a center thickness of a lens with a convex lens surface in an optical axis direction is T2, and a length of a thinnest part of the lens in the optical axis direction is C, and T2 and C satisfy a following formula:

$$2.0<T2/C<3.2.$$

9. The cemented lens according to claim 4, wherein in the first lens surface and the second lens surface, a distance between an apex of a lens surface of a lens with a convex lens surface and a flange surface of the lens in an optical axis direction is T21, a length of a thinnest part of the lens in the optical axis direction is C, and T21 and C satisfy the following formula:

$$T21/C<1.5.$$

10. The cemented lens according to claim 1, wherein a recess is provided in at least one of the first boundary portion and the second boundary portion.

11. The cemented lens according to claim 1, wherein an adhesive is disposed on one of the object-side lens and the image-side lens, and a retention portion that retains the adhesive that flows out when the other of the object-side lens and the image-side lens is superimposed on the one of the lenses is provided radially outside a flange surface of the one of the lenses.

12. The cemented lens according to claim 1, wherein an imaging unit is disposed on a side of the image-side lens opposite to the object-side lens, and wherein the cross section of the first boundary portion comprises an outermost position in a radial direction of an imaging region of the imaging unit.

13. The cemented lens according to claim 1, wherein an imaging unit is disposed on a side of the image-side lens opposite to the object-side lens, and wherein the cross section of the first boundary portion is oriented in such a manner that light from the imaging unit and reflected at the cross section of the first boundary portion travels to a region other than the imaging unit.

14. The cemented lens according to claim 1, wherein a refractive index of the object-side lens is n1, a refractive index of the image-side lens is n2, and a refractive index of the adhesive layer is n3, n1, n2, and n3 satisfy a following formula:

$$|n2-n3|<|n1-n3|.$$

15. The cemented lens according to claim 1, wherein in the first lens surface and the second lens surface, a center thickness of a lens with a convex lens surface in an optical axis direction is T2, and a length of a thinnest part of the lens in the optical axis direction is C, then T2 and C satisfy a following formula:

$$2.0<T2/C<3.2.$$

16. The cemented lens according to claim 1, wherein in the first lens surface and the second lens surface, a distance between an apex of a lens surface of a lens with a convex lens surface and a flange surface of the lens in an optical axis direction is T21, and a length of a thinnest part of the lens in the optical axis direction is C, then, T21 and C satisfy the following formula:

$$T21/C<1.5.$$

17. An imaging lens comprising the cemented lens according to claim 1.

18. An imaging device comprising the imaging lens according to claim 17.

* * * * *